United States Patent
GoGwilt et al.

(10) Patent No.: US 12,307,211 B2
(45) Date of Patent: *May 20, 2025

(54) USING MACHINE LEARNING MODELS TO ANALYZE CONTRACTUAL TERMS AND CLAUSES IN A LEGAL CONTRACT, TO RECOMMEND EDITS, AND TO MAKE CHANGES TO A WORKFLOW

(71) Applicant: Ironclad, Inc., San Francisco, CA (US)

(72) Inventors: Cai GoGwilt, San Francisco, CA (US); Jennifer S. S. Monteleone, Kirkland, WA (US); Adam Weber, San Francisco, CA (US); Yujiao Zhang, San Mateo, CA (US); Angela Kou, Sugar Land, TX (US); Vidya Ravikumar, San Ramon, CA (US); Kevin Verdieck, Oakland, CA (US); Wolfgang Van HellicksonSabelhaus, San Francisco, CA (US); Katherine Vilhena, Oakland, CA (US); Peter Nam That Ton, Milpitas, CA (US); Nilay Amit Sadavarte, San Francisco, CA (US); Sumuk Rao, Fremont, CA (US); Jean-Marc Soumet, Sunnyvale, CA (US); Alexander S. Gillmor, Norton, MA (US)

(73) Assignee: IRONCLAD, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/591,776

(22) Filed: Feb. 29, 2024

(65) Prior Publication Data
US 2024/0202467 A1 Jun. 20, 2024

Related U.S. Application Data

(63) Continuation of application No. 18/467,363, filed on Sep. 14, 2023, now Pat. No. 11,960,849.

(Continued)

(51) Int. Cl.
*G06F 40/56* (2020.01)
*G06F 40/166* (2020.01)

(52) U.S. Cl.
CPC ............ *G06F 40/56* (2020.01); *G06F 40/166* (2020.01)

(58) Field of Classification Search
CPC ....... G06F 40/56; G06F 40/166; G06F 40/131

(Continued)

(56) References Cited

U.S. PATENT DOCUMENTS 11,960,849 B2 * 4/2024 GoGwilt ................. G06F 40/56

OTHER PUBLICATIONS

Ironclad AI Overview (28 pages) retrieved Sep. 14, 2023 from https://support.ironcladapp.com/hc/en-us/articles/12947738534935.

(Continued)

*Primary Examiner* — Thierry L Pham
(74) *Attorney, Agent, or Firm* — Banner & Witcoff, Ltd.

(57) ABSTRACT

Aspects discussed herein may relate to using machine learning models as part of methods and techniques for ingesting, creating, storing, editing, and managing a document. The document may be a legal contract that includes one or more clauses. Among other things, one or more machine learning models may be configured to recognize clauses and/or classifications, or types, of clauses. For example, the one or more generative language models may be used to generate one or more recommended edits to a clause, generate one or more suggested clauses that are missing from the contract, (Continued)

and/or generate one or more suggested locations where a clause may be inserted into or moved within the contract.

20 Claims, 15 Drawing Sheets

Related U.S. Application Data

(60) Provisional application No. 63/482,574, filed on Jan. 31, 2023, provisional application No. 63/375,683, filed on Sep. 14, 2022.

(58) Field of Classification Search
USPC .............................................................. 704/9
See application file for complete search history.

(56) References Cited

OTHER PUBLICATIONS

Webpage, AI-powered Contract Management Software Integrations, Evisort, Connect & Integrate, Seamlessly connected contract data (5 pages) retrieved Sep. 14, 2023 from https://www.evisort.com/product/integrate?utm_device=c&utm_adgroup=152662109991&utm_extension=&utm_landingpage=https://www.evisort.com/product/integrate&lsp=Paid%20Media&lss=Google%20Advertising.

Webpage, Natural Language Processing for Legal Documents, LegalSifter (3 pages) retrieved Sep. 14, 2023 from https://www.legalsifter.com/our-sifters.

Webpage, Automated Contract Review With Artificial Intelligence, Legartis (5 pages) retreived Sep. 14, 2023 from https://www.legartis.ai/.

Webpage, Automated Contract Analysis Software & Analytics, Summize (3 pages) retrieved Sep. 14, 2023 from https://www.summize.com/software/contract-analysis.

Webpage, Automated Contract Review—Accelerating Contracting, ThoughtRiver (5 pages) retrieved Sep. 14, 2023 from https://www.thoughtriver.com/.

* cited by examiner

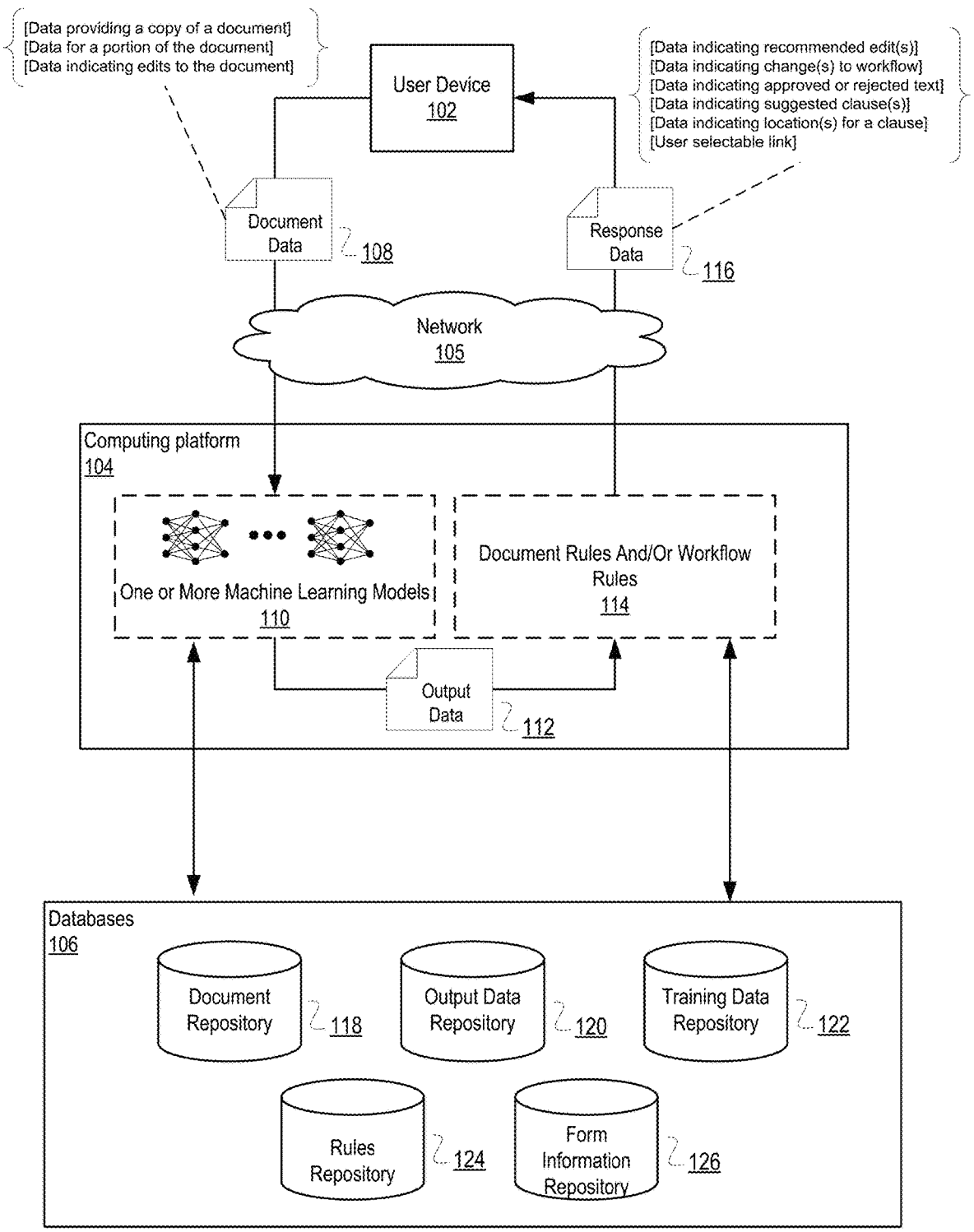
FIG. 1    Example Networked Document Workflow Environment    100

< Vendor MSA with Acme Co.

11.5. Relationship of the Parties. Vendor and Customer are independent contractors, and nothing in this Agreement or any attachment hereto will create any partnership, joint venture, agency, franchise, sales representative, or employment relationship between the parties.

11.6. Non-Solicitation. During the Term and for one (1) year thereafter, Vendor shall not encourage or solicit any employee, independent contractor, vendor, or client of customer to leave or terminate its relationship with Customer for any reason.

11.7. No Third-Party Beneficiaries. There are no third party beneficiaries to this Agreeement.

11.8. Choice of Law and Jurisdiction. This Agreement is governed by and construed in accordance with the laws of the State of California and the federal U.S. laws applicable therein, excluding its conflicts of law provisions. Customer and Vendor agree to submit to the personal and non-exclusive jurisdiction of the courts located in Santa Clara County, California. The parties agree that the United Nations Convention on Contracts for the International Sale of Goods will not apply to this Agreement.

11.9. Manner of Giving Notice. Notices regarding this Agreement shall be in writing and addressed to Customer at the address Customer provides, or, in the case of Vendor, to the address for Vendor set forth above. Notices regarding the Platform in general may be given by electronic mail to Customer's email address on record with Vendor.

11.10. Force Majeure. Neither party shall be liable to the other for any delay or failure to perform hereunder (excluding payment obligations) due to circumstances beyond such party's reasonable control, including acts of God, pandemic, Internet backbone outages, acts of government, flood, fire, earthquakes, civil unrest, acts of terror, strikes or other labor problems (excluding those involving such party's employees), service disruptions involving hardware, software or power systems not within such party's reasonable control, and denial of service attacks.

11.11. Entire Agreement. This Agreement and any Orders represent the entire agreement of the parties concerning its subject matter and is intended to be the final expression of their Agreement, and supersede all prior and contemporaneous agreements, proposals, or representations, whether written or oral. No failure or delay in exercising any right hereunder shall constitute a waiver of such right. No amendment or waiver of any provision of this Agreement or an Order shall be effective unless in writing and signed (either manually or electronically) by an authorized representative of Customer and Vendor.

11.12. Severability. If any provision of this Agreement is held by a court of competent jurisdiction to be contrary to law, such provision shall be modified by the court and interpreted so as best to accomplish the objectives of the original provision to the fullest extent permitted by law, and the remaining provisions shall remain in effect.

12. Definitions.

12.1. "Customer Data" means any data, information or material processed or stored by Customer in the Platform.

12.5 "Order" means a document for purchases of Services hereunder, prepared by Vendor, signed by Customer, and accepted by Vendor.

---

Playbook
For all Vendor MSA workflows

Add Clause

Needs Review (1)

× Unacceptable Clause. Pending approval
Non-Solicitation
This clause is not permitted for this contract type
Custom

Approved (3)

Governing Law
New York, California & Delaware are preferred. Any other states must be approved by Legal.
✓ Custom

Term
Net 30 default payment terms. Exceptions must be approved by Finance.
✓ Standard

Counterpart
Required for all Vendor MSA agreements.
✓ Custom

✽ AI Auto-Redline                                                    ✕

570

● Governing Law

572
This Agreement shall be governed by the laws of the State of ColoradoCalifornia without regard to its conflict of laws provisions. Any legal action or proceeding relating to this Agreement shall be brought exclusively in the state or federal courts located there. Company and Customer hereby agree to submit to the jurisdiction of, and agree that venue is proper in those courts in any such legal action or proceeding.

● Indemnification

574
~~Customer shall defend, indemnify, and hold harmless Company, its officers, directors and employees, from and against any action or suit brought against Company by a third party based on a claim that the Customer Data infringe any Intellectual Property Rights of a third party. Customer's obligations under this Section 8.5 are contingent upon: (i) Company providing Customer with prompt written notice of such claim; (ii) Company providing reasonable cooperation to Customer, at Customer's expense, in the defence and settlement of such claims; and (iii) Customer having sole authority to defend or settle such claim, provided that it may not settle any claim in a manner that imposes any material liability upon Company.~~

● Non-Solicitation

576
~~Any solicitation in the form of a general advertisement or specifically targeted at such individually or a group of individuals, shall violate this provision.~~

● Payment Description

578
Invoices; Payment. Unless otherwise set forth in an Order Form, Company shall invoice Customer annually in advance for the Service. Each invoice shall be due and payable within thirty (30)forty-five (45) days of receipt by Customer. All payment obligations are non-cancellable, and other than as provided in the Agreement, all amounts paid are non-refundable. Company shall be entitled, in its sole discretion, to withhold performance and discontinue Customer's access to the Master Services until all amounts past due are paid in full.

● Attorney Fees

580
Attorneys Fees. If any action at law or in equity is necessary to enforce or interpret the terms of this agreement, the prevailing party shall be entitled to reasonable attorneys' fees, costs and necessary disbursements in addition to any other relief to which such party may be entitled.

Cancel    Draft

601 — Vendor MSA with Acme Co.

Track Changes — All document changes saved

11.5. Relationship of the Parties. Vendor and Customer are independent contractors, and nothing in this Agreement or any attachment hereto will create any partnership, joint venture, agency, franchise, sales representative, or employment relationship between the parties.

11.6. Non-Solicitation. During the Term and for one (1) year thereafter, Vendor shall not encourage or solicit any employee, independent contractor, vendor, or client of customer to leave or terminate its relationship with Customer for any reason.

11.7. No Third-Party Beneficiaries. There are no third party beneficiaries to this Agreement.

606 — 11.8. Choice of Law and Jurisdiction. This Agreement is governed by and construed in accordance with the laws of the State of Colorado

602

Playbook — For all Vendor MSA workflows — ⊕ Add Clause

605 — Needs Review (1)
× Clause needs review

Governing Law
New York, California & Delaware are preferred. Any other states must be approved by Legal.

607 — Request Approval

< Vendor MSA with Acme Co.   ✓ All document changes saved   Close

← → ⌂ ✎ ✗ ⌂ ⌂ ▽ 100% + | Track Changes ⊙ ▼ | ⬤ | ※ Comment

641

11.5. Relationship of the Parties. Vendor and Customer are independent contractors, and nothing in this Agreement or any attachment hereto will create any partnership, joint venture, agency, franchise, sales representative, or employment relationship between the parties.

11.6. Non-Solicitation. During the Term and for one (1) year thereafter, Vendor shall not encourage or solicit any employee, independent contractor, vendor, or client of customer to leave or terminate its relationship with Customer for any reason.

11.7. No Third-Party Beneficiaries. There are no third party beneficiaries to this Agreement.

11.8. Choice of Law and Jurisdiction. This Agreement is governed by and construed in accordance with the laws of the State of Colorado

644

12. Definitions.
12.1. "Customer Data" means any data, information or material processed or stored by Customer in the Platform.

642

Playbook  ⊕ Add Clause
For all Vendor MSA workflows

645

✓ Needs Review (2)
✗ Clauses needs review

Governing Law
This clause (11.6) is usually accompanied by a Severability clause. Do you want to add a Severability clause using default language?

646  [ Yes ]  [ No ]  648

650

Definition
A definition for "Customer Data" has been added to more than five recent documents. Do you want to add a rule or create a new template?

652  [ Add Rule ]  [ Create Template ]  654

FIG. 6C

USING MACHINE LEARNING MODELS TO ANALYZE CONTRACTUAL TERMS AND CLAUSES IN A LEGAL CONTRACT, TO RECOMMEND EDITS, AND TO MAKE CHANGES TO A WORKFLOW

CROSS-REFERENCE TO RELATED APPLICATIONS

The present application is a continuation of U.S. application Ser. No. 18/467,363 filed on Sep. 14, 2023, which claims the priority benefit of both U.S. provisional application No. 63/482,574, filed Jan. 31, 2023, and titled "USING MACHINE LEARNING MODELS TO ANALYZE CONTRACTUAL TERMS AND CLAUSES IN A LEGAL CONTRACT, TO RECOMMEND EDITS, AND TO MAKE CHANGES TO A WORKFLOW"; and U.S. provisional application No. 63/375,683, filed Sep. 14, 2022, and titled "RECOMMENDED DOCUMENT EDITS OR CHANGES IN WORKFLOW BASED ON MACHINE LEARNING MODELS". Each of the above-mentioned applications is incorporated herein by reference in its entirety.

FIELD

Aspects described herein relate generally to editing a document, such as a legal document, via networked devices; a workflow for, among other things, editing the document via the networked devices; and the use of machine learning models to analyze contractual terms and clauses in a legal document, to recommend edits, and/or make changes to a workflow.

BACKGROUND

A networked system may allow for parties to, among other things, create, store, edit, and manage a document. The various processes involved in creating, storing, editing, and managing the document may be part of an overall process for the document referred to as a workflow. User experience of the workflow is important and challenging. For example, as parties edit the document, any edit may need to be manually accepted or rejected by the parties. This manual process is slow and susceptible to human error, and diminishes the user experience to the workflow of the document. Moreover, depending on the type of edits being made, different parties may need to accept or reject the edits than the person actually making the edits. The person making the edits may make an error in not requesting the correct party to approve or reject the edits. To correct errors of this kind, the contract may need to be reviewed manually by multiple parties, which takes time and is not always reliable, and further diminishes the user experience to the workflow.

SUMMARY

The following presents a simplified summary of various aspects described herein. This summary is not an extensive overview, and is not intended to identify key or critical elements or to delineate the scope of any claim. The following summary merely presents some concepts in a simplified form as an introductory prelude to the more detailed description provided below.

Aspects discussed herein may relate to methods and techniques for performing a workflow associated with one or more documents. For example, a workflow may include ingesting, creating, storing, editing, and managing of a document and may be performed via networked devices. The methods and techniques described herein, and/or various combinations of the features described herein, may improve the workflow of the document and/or any portion of the workflow of the document. As some examples, the methods and techniques described herein may improve the workflow of a document by using one or more machine learning models as a basis for recommending edits to the document and/or making changes in the workflow. Generally, the one or more machine learning models may include one or more natural language models, such as a generative language model or an extractive language model.

In some examples, the document may be a legal contract between parties. One or more natural language processing models may be configured to generate output data that indicates one or more suggestions or recommendations for a contract. For example, the one or more generative language models may be used to generate one or more recommended edits to a clause, generate one or more suggested clauses that are missing from the contract, and/or generate one or more suggested locations where a clause may be inserted into or moved within the contract.

One or more arrangements discussed below may include a computing platform receiving document data from a user device. The document data includes at least a clause of a legal contract or an edit to the legal contract. The computing platform may select, from a plurality of natural language processing models, one or more natural language processing models that will process the document data. The plurality of natural language processing models may include one or more first natural language processing models that are configured to recognize one or more contractual terms of the legal contract and one or more second natural language processing models that are configured to recognize one or more types of clauses of the legal contract. The computing platform may use the one or more natural language processing models to process the document data, resulting in output data from the one or more natural language processing models. The computing platform may determine response data based on applying one or more document rules and/or workflow rules to the output data. The response data may indicate a recommended edit to the legal contract or a change in a workflow of the legal contract. The computing platform may send the response data to at least one user device (e.g., for display).

BRIEF DESCRIPTION OF THE DRAWINGS

The present disclosure is illustrated by way of example and not limited in the accompanying figures in which like reference numerals indicate similar elements and in which:

FIG. 1 depicts a block diagram of an example networked document workflow environment that uses one or more machine learning models as a basis for recommending edits to a document and/or making changes to a workflow of the document.

FIG. 2 depicts an example display screen that may be displayed on a user device according to one or more aspects described herein.

FIGS. 5A-5C depict yet further examples of display screens that may be displayed on a user device according to one or more aspects described herein.

FIGS. 6A-6C depict additional examples of display screens that may be displayed on a user device according to one or more aspects described herein

DETAILED DESCRIPTION

Figure 3:
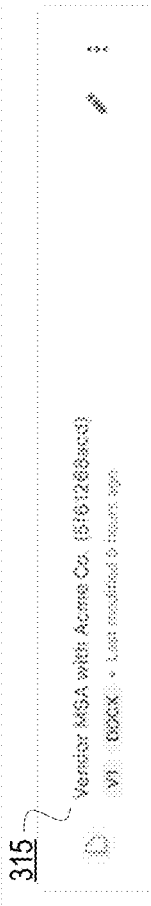
FIG. 3 depicts another example display screen that may be displayed on a user device according to one or more aspects described herein.

The present disclosure is illustrated by way of example. Further, in the following description, reference is made to the accompanying drawings, which form a part hereof, and an appendix, which also forms a part hereof. The description, drawings, and appendix provide examples of various embodiments in which aspects of the disclosure may be practiced. It is to be understood that other embodiments may be utilized and structural and functional modifications may be made without departing from the scope of the present disclosure. Aspects of the disclosure are capable of other embodiments, and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for ingesting, creating, storing, editing, and managing a document. Even more generally, aspects discussed herein may relate to methods and techniques for performing a workflow of a document. The workflow may include the ingesting, creating, storing, editing, and managing of the document and may be performed via networked devices. The methods and techniques described herein, and/or various combinations of the features described herein, may improve the workflow of the document and/or any portion of the workflow of the document. As some examples, the methods and techniques described herein may improve the workflow of a document by using one or more machine learning models as a basis for recommending edits to the document and/or making changes in the workflow. For simplicity, networked devices that perform a workflow of a document will be referred to as a networked document workflow environment. Also for simplicity, a machine learning model may be referred interchangeably herein as a model. A party may be referred interchangeably herein as a user.

In some examples, the document may be a legal contract between parties. For simplicity, a legal contract may be referred herein interchangeably as a contract. The workflow of a contract may include processes specific to the contract. For example, the workflow may include processes where various clauses are negotiated between the parties. During the negotiation, clauses may be added, edited, reviewed, accepted, and sent to another party, whereby they may perform their own additions, edits, review, and acceptance. Particular clauses and/or particular language introduced to a clause may introduce additional people that need to review, and approve or reject, the contract before the contract is sent to another party or before the negotiation of the contract can be complete. There are a wide variety of clauses that can be included in a contract and those types may depend on many different factors including, for example, the subject matter of the contract, the legal requirements of the contract, the preferences of the parties, standard practices associated with the contract, and the like. As will be discussed in more detail below, one or more machine learning models may be configured to recognize clauses and/or classifications, or types, of clauses. As a few non-limiting examples of clauses, a contract may include party identification clauses, term clauses, termination clauses, choice of law clauses, limitation clauses, exclusion clauses, indemnity clauses, and the like. Additional examples of the types of clauses that may be included in a contract and, therefore, recognized by one or more machine learning models will be apparent by the examples discussed below. A contractual term may be an example of one of the different types of properties that a document may include.

As will be discussed in more detail below, the one or more machine learning models may include, or otherwise be, one or more natural language processing models. The one or more natural language processing models may be one or more types of natural language processing models. For example, the one or more natural language processing models may include one or more generative language models and/or one or more extractive language models that are configured to performing certain tasks. Further details of a generative language model, an extractive language model, and the tasks that can be performed are provided below. As an introduction, one or more generative language models may be configured to generate output data that indicates one or more suggestions or recommendations for a contract. For example, the one or more generative language models may be used to generate one or more recommended edits to a clause, generate one or more suggested clauses that are missing from the contract, generate one or more suggested locations where a clause may be inserted into or moved within the contract, translate language of a clause, summarize one or more clause or an entirety of a contract, and/or answer questions related to a contract. One or more extractive language models may be configured to classify clauses of the legal contract as one or more types of clauses (e.g., classify a clause as a governing law clause, a non-solicitation clause, a severability clause, or some other type of clause) and/or to recognize contractual terms of the legal contract (e.g., recognize whether contractual terms such as venue and jurisdiction are included in the legal contract).

In some arrangements, the type of natural language processing model that is used to perform a certain task may be based on the task being performed and/or how the output from the natural language processing model will be used. For example, a task to suggest an edit to a clause may be performed by a generative language model. A task to classify a clause as one or more types of clauses may be performed by an extractive language model. As an additional example, if the output, or a portion thereof, will be displayed to a user, a generative language model may be used. If the output, or a portion thereof, will be used as a basis for determining input to another natural language model, an extractive language model may be used. While the examples discussed below are provided with certain tasks being performed by certain type of natural language processing models, other arrangements and examples may have different types of natural language processing models perform those certain tasks. For example, the examples discussed in connection with FIGS. 5A-5C have a generative language model as performing a task to suggest edits to a clause. In some other arrangements or examples, an extractive language model may perform a task to suggest edits to a clause. As another example, the examples discussed in connection with FIGS. 6A-6C discuss an extractive language model as performing a task to classify a clause. In some other arrangements or examples, a generative language model may perform a task to classify a clause.

Additionally, based on the clauses, a contract may include various contractual terms. The contractual terms may define information about the contract. For example, some contractual terms may provide information identifying the parties, some contractual terms may define the relationship between the parties, and some contractual terms may define obligations for the parties of the contract. Contractual terms may be explicitly included in the contract (e.g., a clause may explicitly include information identifying the parties by using certain terms or phrases such as the counterparty is "Person A") and/or implicitly included in the contract (e.g., one or more clauses, based on their text, may establish a contractual term between the parties, but may do so without explicitly including certain terms or phrases). As will be discussed in more detail below, one or more machine learning models may be configured to recognize contractual terms, whether explicitly or implicitly in clauses of the contract. As a few non-limiting examples of contractual terms, a contract may include contractual terms for party names, agreement date, governing law, and the like. Additional examples of contractual terms and, therefore, recognized by one or more machine learning models will be apparent by the examples discussed below.

FIG. 1 depicts a block diagram of an example networked document workflow environment 100 that uses one or more machine learning models 110 as a basis for recommending edits to a document and/or making changes to a workflow of the document. As depicted, the example networked document workflow environment 100 includes a user device 102, a computing platform 104, various databases 106, and a network 105 that facilitates communication between the user device 102 and the computing platform 104. The example networked document workflow environment 100 provides a very simplified example of a suitable networked computing environment in which aspects described herein may be implemented. A suitable networked environment may include many user devices, many computing platforms, many databases, and other networked devices. In this way, the user device 102, the computing platform 104, and the various databases 106 depicted in FIG. 1 may be part of a much larger system of networked devices that form a larger example than the simplified example of the networked document workflow environment 100.

The simplified example depicted in FIG. 1 is shown to illustrate the ways in which the one or more machine learning models 110 may be used as part of the networked document workflow environment 100. As a brief summary, the user device 102 may, as part of performing a workflow for a document, send document data 108 to the computing platform 104 via the network 105. The document data 108 may include a copy of the document (e.g., data including an entirety of the document), data for a portion of the document (e.g., data including one or more clauses of a contract), data indicating edits to the document (e.g., data including edited portions of a clause of a contract), and the like. After receiving the document data 108, the computing platform 104 may provide the document data 108 as input to the one or more machine learning models 110 or otherwise use the document data 108 as a basis for determining input to the one or more machine learning models. The one or more machine learning models 110 may generate, or otherwise provide, output data 112 that indicates the result of processing the document data 108 via the one or more machine learning models 110. The computing platform 104 may process the output data 112, such as by applying document rules and/or workflow rules 114, to determine response data 116. The response data 116 may, among other things, indicate recommended edits to the document, indicate changes to the workflow of the document, indicate whether text is approved or rejected based on the document rules and/or workflow rules, indicate one or more suggested clauses to add to the document, indicate one or more locations where a clause may be inserted into or moved within the document, and the like. The response data 116 may include additional data, such as a user selectable link or graphical data. A user selectable link may allow a user to view a portion of the document (e.g., by jumping a user interface to a location in the document and/or by opening the document in a user interface), the recommended edit(s), and/or the change(s) to the workflow. Graphical data may include various visual depictions of the document, recommended edit(s), change(s) to the workflow, and the like. Such additional data may also include data indicating workflow status (e.g., data identifying reviewers for the document, data indicating a needed step before proceeding in the workflow, data indicating a next step in the workflow, and the like).

Each of the one or more machine learning models 110 may be any suitable type of machine learning model that is configured to process document data 108. For example, each of the one or more machine learning models 110 may include a neural network such as a recurrent neural network architecture or some other type of deep learning architecture. Examples of a suitable recurrent neural network architecture include a long short-term memory (LSTM) and a Gated Recurrent Unit (GRU).

In some arrangements, each of the one or more machine learning models 110 may include, or otherwise be, a natural language model. Examples of a natural language model may include a generative language model and/or an extractive language model. While both a generative language model and an extractive language model may be based on a Transformer, which is a deep learning architecture, a generative language model and an extractive language model may differ in various ways. One way they differ, for example, is that a generative language model may generate output data to appear as human-written language (e.g., words, sentences and/or paragraphs generated by the generative language model), while an extractive language model may extract output data from pre-existing text (e.g., words, sentences, and/or paragraphs extracted from the pre-existing text).

Examples of a suitable generative language model is a Generative Pre-Trained Transformer (GPT), such as GPT-2, GPT-3, GPT-4, or ChatGPT by OpenAI. The GPT may be an off-the-shelf version of a GPT (e.g., ChatGPT) or may be a version of a GPT specifically configured to process clauses and/or contractual terms of a contract. A GPT may allow users to input text (sometimes referred to as a prompt) and, in response, the GPT may generate output that includes natural language (e.g., in sentence and/or paragraph form), which may be difficult to discern from human-written language. Additional examples of a generative language model that may be used includes a Generative Adversarial Network (GAN). In some arrangements, a generative language model may be executed by a third-party computing system (not shown in FIG. 1), such as by a computing system, controlled by OpenAI, that makes various versions of GPT available for use. In this way, using a generative language model may include communication with the third-party computing system.

Examples of a suitable extractive language model is a Bidirectional Encoder Representations from Transformers (BERT) or a model based on BERT. The extractive language model may be pre-trained (e.g., a version of BERT pre-trained using a large corpus of language data) or may be specifically trained to process clauses and/or contractual terms of a contract (e.g., a version of BERT trained using a corpus of contract data). Further, an extractive language model may be pre-trained (e.g., a version of BERT pre-trained using a large corpus of language data) and then further trained to process clauses and/or contractual terms of a contract (e.g., the pre-trained version of BERT may be further trained using a corpus of contract data). An extractive language model may be used when performing various tasks associated with the one or more generative language models. For example, documents, or portions thereof, may be sent to one or more extractive language models as a pre-processing step to generate training data for the one or more generative language models (e.g., output from BERT may be used when training the one or more generative language models). As another example, a portion of a document may be sent to the one or more extractive language models as a way to enrich input that is sent to the one or more generative language models (e.g., output from BERT may be used as input to the one or more generative language models when analyzing documents). More specifically and as will be discussed below, an extractive language model may classify clauses as one or more types of clauses, may be used to recognize contractual terms, and the like. The classification of the clauses and/or recognized contractual terms may then be used as a basis for determining input data for a generative language model.

While FIG. 1 depicts the response data 116 being sent to the same user device 102 that sent the document data 108, some instances may result in the response data 116 being sent to additional or alternative user devices. For example, the response data 116 may be sent to a different user device than the user device 102 that sent the document data (e.g., so that the user of the different user device may review the document to accept or reject an edit). For example, as a user of the user device 102 edits a clause in a document, the computing platform 104 may, based on the document data 108 that includes the edits to the clause, determine to change the workflow by adding a reviewer that is required to review, and approve or reject, the edits to the clause. Based on this determination, the computing platform 104 may send the response data 116 to a user device associated with the reviewer (e.g., a user device not depicted in FIG. 1) to notify the reviewer that the workflow has changed and that they need to review the clause, and approve or reject the edits. As reviewers are added to document's workflow, the computing platform 104 may store a historical record of which reviewers were added, whether the reviewer approved or rejected a change, and text data of the clause that required approval. The historical record may be stored in one of the databases 106 and/or as metadata to the document.

Additionally, while FIG. 1 depicts a data flow going from the one or more machine learning models 110 to the document rules and/or workflow rules 114 in a single step, the depicted data flow may be part of an iterative process that uses multiple machine learning models and applies the document rules and/or workflow rules in plural instances. In some instances, the iterative process may include a data flow that goes between the one or more machine learning models 110 and the document rules and/or workflow rules in both directions. Further, while FIG. 1 depicts the document data 108 as going directly to the one or more machine learning models 110, the computing platform 104 may perform preprocessing on the document data 108 to prepare it for input to the one or more machine learning models 110 and/or to select which of the one or more machine learning models 110 will process the document data 108.

Throughout these processes involving the document data 108, the output data 112, and the response data 116, various databases 106 may be accessed. As depicted in FIG. 1, examples of the various databases 106 that may be accessed include a document repository 118 (e.g., a database storing documents as a searchable index); an output data repository 120 (e.g., a database storing a record of output data generated by the one or more machine learning models); a training data repository 122 (e.g., a database storing at least one corpus of data for training the one or more machine learning models); a rules repository 124 (e.g., a database storing the document rules and/or workflow rules 114 used by the computing platform 104); and a form information repository 126 (e.g., a database storing user-configured and standardized language for documents, user-configured templates for creating documents, default rules for workflows, user-configured criteria for analyzing documents, and the like).

Additionally, throughout these processes involving the document data 108, the output data 112, and the response data 116, the various databases 106 may be updated to store data generated by the processes involving the document data 108, the output data 112, and the response data 116. For example, all document data, metadata, changes in workflow, and output from the one or more machine learning models 110 may be stored to the various databases 106. Such data may provide a record of how the document was processed, which may be used as a basis to generate reports, determine insights, and perform audits as to how one or more documents were processed.

Each of the networked devices depicted in FIG. 1 may implement software that performs various parts of the workflow for a document. In some embodiments, the networked devices may implement software provided by IRONCLAD (e.g., IRONCLAD contract management software). The user device 102 may provide, via software provided by IRONCLAD, a document editing user interface that allows a user to, among other things, perform various tasks associated with a workflow of a document including the ingestion, creation, viewing, editing, reviewing, and storing of a document. The computing platform 104 may provide, via SOFTWARE provided by IRONCLAD, various support processes that manage the workflow and manage communication between any other networked devices that are involved with the workflow. Examples of the various support processes that may be performed by the computing platform include processes for ingesting a document, establishing a workflow for the document, converting a document to different formats, performing optical character recognition (OCR) processes on the document, analyzing the document, and the like. Analyzing the document may include the collection of additional data about the document including, for example, tag data that allows the document to be part of the searchable index and/or may indicate various properties about the document; statistical data that is usable to generate visualizations, such as graphs or charts, involving the document; workflow status data that indicates information about the workflow and its status; and metadata associated with the document. This additional data may be stored in one or more of the various databases 106. The various databases 106 may provide, via software provided by IRONCLAD, repositories and other storage locations that support workflows for documents and/or other processes associated with the workflows (e.g., establishing and storing the document rules and/or workflow rules 114) or documents (e.g., searching the documents). Some of the various databases 106 may be configured to support particular features of the software provided by IRONCLAD. For example, the rules database 124 and/or the form information database 126 may be configured to support the Playbook feature of software provided by IRONCLAD.

The example networked document workflow environment 100 is shown to illustrate that the one or more machine learning models 110 can be used at any portion of the workflow. For example, the one or more machine learning models 110 may be used as part of a workflow subprocess for ingesting a document, creating a document, editing a document, storing a document, receiving a document from another party, reviewing a document, and the like. The one or more machine learning models 110 may be configured to operate at a particular level of a document. For example, the one or more machine learning models 110 may be configured to process input data that is at an entirety of a document, at a portion of a document (e.g., one or more clauses of a contract), and at a specific property of a document (e.g., a specific edit to a document and/or a specific contractual term for a contract). In this way, the one or more machine learning models 110 may be configured to receive, as input, an entirety of a document, a portion of the document, and/or a specific edit of a document. The one or more machine learning models 110 may be configured to process additional data associated with a document. For example, the one or more machine learning models 110 may be configured to receive, as input, metadata associated with the document, tag data associated with the document, document rules, workflow rules, output data from a machine learning model, and the like. This additional data may be in addition to, or as an alternative to, any input data that is at a particular level of a document (e.g., a machine learning model may be configured to receive, as input, a clause of a contract, tag data associated with the document, and output data from another machine learning model).

The one or more machine learning models 110 may be configured such that the output data is for a particular level of a document. For example, the one or more machine learning models 110 may be configured to output data that indicates a result for an entirety of a document (e.g., output data that indicates whether the document includes a particular classification, or type, of clause and a confidence value for that indication); a result for a portion of the document (e.g., output data that indicates whether a clause is a particular classification, or type, of clause and a confidence value for that indication); and a result for a specific property of the document (e.g., output data that indicates whether a specific edit requires review by an additional reviewer and a confidence value for that indication; output data that indicates whether a contractual term requires review by an additional reviewer and a confidence value for that indication).

A machine learning model may operate at different levels of a document than other machine learning models. Some machine learning models may operate at an entirety of the document (e.g., receive an entirety of a document as input and generate output data for the entirety of the document). Other machine learning models may operate at a portion of the document (e.g., receive a clause of a contract as input and generate output for the clause; receive a grouping of clauses of a contract as input and generate output for the clause). Yet other machine learning models may operate at a specific property of a document (e.g., generate output for a particular contractual term of a contract). Yet further machine learning models may operate over two or more documents (e.g., receive an entirety of two or more documents; receive similar portions of two or more documents, such as by receiving the choice of law clauses from two or more contracts).

In view of the one or more machine learning models 110 being capable of operating at different levels of a document, the one or more machine learning models 110 may be trained at different levels of a document. For example, some machine learning models may be trained based on a corpus of data that includes various entireties of documents (e.g., a corpus of data that includes thousands of contracts). Other machine learning models may be trained based on a corpus of data that includes various portions of documents (e.g., a corpus of data that includes thousands of clauses of contracts). Yet other machine learning models may be trained based on a corpus of data that includes various properties of documents (e.g., a corpus of data that includes thousands of contractual terms included in contracts). The one or more machine learning models 110 may be trained based on a corpus of data that includes other types of data in addition to, or alternatively from the documents described herein (e.g., the one or more generative language models may be trained based on a variety of data such as web data repositories (e.g., Common Crawl), books, web sites (e.g., Wikipedia.com) and the like. The one or more machine learning models 110 may be trained using any suitable algorithm for training a neural network, GPT, or different type of model that is being used to process the document data 108.

The workflow rules and/or the document rules 114, and the response data 116 can also be configured to operate at different levels of a document. The workflow rules and/or the document rules 114 may include rules for an entirety of a document (e.g., a rule that indicates a contract is never to include particular type of clause), rules for a portion of the document (e.g., a rule that indicates what is standard language for a particular type of clause), and/or rules for a specific property of the document (e.g., a rule that indicates an impermissible edit and/or an edit that requires adding a particular reviewer to the workflow). The response data 116 may include data for an entirety of the document (e.g., data indicating the types of clauses included in the document), data for a portion of the document (e.g., data indicating a recommended edit for a particular clause in the document), data for a specific property of the document (e.g., data indicating that inclusion of a contractual term requires review by an additional reviewer).

Table I, Table II, and FIGS. 2, 3, 4A-4C, 5A-5C, and 6A-6C provide additional examples of how the one or more machine learning models 110 operate at the different levels of a document, how the workflow rules and/or document rules 114 are configured at the different levels of a document, and how both are used as a basis by the computing platform 104 in determining the response data 116. Following Table II are examples of how the one or more machine learning models 110 may be used by the computing platform 104 in determining the response data 116. Indeed, FIGS. 2, 3, 4A-4C, 5A-5C and 6A-6C provide additional examples how the one or more machine learning models 110 may be used by the computing platform 104 in determining the response data 116. More specifically, FIGS. 2, 3, 4A-4C, 5A-5C and 6A-6C provide example display screens that provide examples how one or more natural language processing models may be used by the computing platform 104 in determining response data 116.

Table I lists examples of a property of a document that may be recognized by the one or more machine learning models 110 at one or more levels of a document and/or used as a basis for configuring the document rules and/or the workflow rules 114. More specifically, Table I lists example contractual terms for a contract. In this way, a machine learning model may recognize contractual terms for a contract. For example, a machine learning model may operate at a particular level of a document, receive input at the particular level, and generate output data that indicates whether at least one of the contractual terms listed in Table I is in the input. The output data may also include a confidence value indicating confidence in whether the at least one contractual term is in the input. As a more particular example where the at least one contractual term is a contract name, the machine learning model may generate output data that indicates whether a contract name is in input and a confidence value for the indication. As another example, a document rule and/or workflow rule may be configured such that a particular reviewer is added to the workflow if venue, another example of a contractual term, is recognized by a machine learning model. The computing platform 104 may also store data based on the examples listed in Table I. For example, if a machine learning model recognizes the contract name, the computing platform 104 may assign the actual value of the contract name as the filename in the document repository 118. Table I includes, in each row, an example contractual term and a corresponding description for the contractual term.

TABLE I

| Example contractual term | Description of example contractual term |
|---|---|
| Contract name | A name for the document (e.g., a combination of the contract type and counterparty name). This may be the filename for the document as stored in the document database. |
| Counterparty name | The names of the contracting counterparty. |
| Counterparty address | An address of the counterparty to the contract. |
| Agreement date | An effective date of the contract. |
| Expiration date | An end date or expiration date of the contract. |
| Term length | A term of the contract as an amount of time (e.g., 24 months) |
| Signer name | The name of the signer for each party to the contract. |
| Total contract value | Total amount including currency codes and symbols (may also be referred to as a fee amount). |
| Governing law (or choice of law) | Choice of law for the contract (e.g., jurisdiction of law controlling the contract). |
| Venue | Location of the courts where legal proceedings will take place. |
| Termination notice period | The period by which notice of termination must be given (e.g., 30 days). |
| Termination for convenience | An indication as to whether one or all parties may terminate the contract without cause, or at their convenience (e.g., true or false). |
| Auto-renewal | An indication as to whether the contract term automatically renews (e.g., true or false). |

TABLE I-continued

| Example contractual term | Description of example contractual term |
|---|---|
| Opt out length | An indication of a required notice to not renew (e.g., 30 days). |
| Renewal term | A length of time the renewal period will last (e.g., 1 year, 2 year, 36 months, etc.). |
| Termination for cause | An indication as to whether one or all parties may terminate the contract with cause, such as for breach of contract (e.g., true or false). |
| Payment term | A period at which payments are made (e.g., monthly, annually, one-time, etc.). |

Table II lists example classifications, or types, of portions of a document that may be recognized by the one or more machine learning models 110 at the one or more levels of the document and/or used as a basis for configuring the document rules and/or the workflow rules 114. More specifically, Table II lists classifications, or types, of clauses for a contract. In this way, a machine learning model may recognize classifications, or types, of clauses for a contract. Document rules and/or workflow rules 114 may be configured for particular classifications, or types, of clauses for a contract. For example, a machine learning model may operate at a particular level of a document, receive input at the particular level, and generate output data that indicates whether the input is a particular classification, or type, of clause for a contract listed in Table II. As a more particular example where the classification, or type, of clause is a confidential information clause, the machine learning model may generate output data that indicates whether a confidential information clause is in input and a confidence value for the indication. As another example, a document rule and/or workflow rule may be configured such that a particular reviewer is added to the workflow if a confidential information clause is recognized by a machine learning model. The computing platform 104 may also store data based on the examples listed in Table II. For example, if a machine learning model recognizes the insurance clause, the computing platform 104 may determine and store a count of how many times the insurance clause has appeared in contracts. Table II includes, in each row, an example classification, or type, of clause for a contract and a corresponding description for the example classification, or type, of clause.

TABLE II

| Example classification, or type, of clause | Description of example classification, or type, of clause |
|---|---|
| Amendment or modification | The amendment or modification clause may state that the contract may be modified or amended going forward and sets forth the requirements for the amendment or modification of the contract. |
| Arbitration | The arbitration clause may require the parties to the contract to resolve any dispute arising out of the contract through an arbitration process, as opposed to litigation or mediation. |
| Confidential information | The confidential information clause may state the type(s) of information to be treated as confidential and how that information should be protected and handled. |
| Counterparts | The counterparts clause may state that the parties to the contract do not all need to sign the same copy. |
| Disputes | The disputes clause may include information as to how the parties may resolve disputes. Resolutions typically include arbitration, litigation, and/or mediation. |

TABLE II-continued

| Example classification, or type, of clause | Description of example classification, or type, of clause |
|---|---|
| Entire agreement | The entire agreement clause may state that the contract constitutes the entire agreement between the parties on the subject matter at issue. This clause prevents the parties from being liable for any statements or pre-contract negotiations except as expressly stated in the agreement. |
| Governing law (or choice of law) | The governing law clause may specify which jurisdiction's law will apply in the event of a dispute. |
| Indemnification | The indemnification clause may obligate one party to compensate another party for certain costs and expenses, usually initiated by third party claims. |
| Insurance | The insurance clause may establish what insurance one or more parties must procure in connection with the contract. |
| Intellectual property | The intellectual property clause may set forth ownership, permitted uses, and/or use restrictions on intellectual property. |
| Limitation of liability | The limitation of liability clause may limit the amount and types of compensation one party can recover from the other party when a claim is made or lawsuit is filed in response to a breach of the contract. |
| Non-solicitation | The non-solicitation clause may prohibit a party from soliciting members of the counterparty's workforce for employment with the party, for a specified duration of time. |
| Notice | The notice clause may set forth how each party should receive notices relating to the contractual relationship between the parties. |
| Payment description | The payment description clause may detail conditions by which a party will be compensated. |
| Purpose | The purpose clause may state the intent of the contract. |
| Remedies | The remedies clause may set forth the type of relief the parties are entitled to for breach of contract or other potential claims, such as monetary damages. |
| Severability | The severability clause may indicate the remaining portions of the contract remain in effect if a court should find one or more of the provisions void or illegal. |
| Term | The term clause may define the period over which the contract has legal effect. |
| Termination | The termination clause may explain what will happen if either party terminates the contract. This clause may also set for the circumstances in which one party may terminate the contract, such as basis for termination or required notice. |
| Waiver | The waiver clause may define how a party can waive a right set forth in the contract. This clause may also set forth what rights are not being waived by agreeing to the contract. |
| Warranty | A warranty clause may promise the accuracy, completeness, or performance of the confidential information. NDAs usually disclaim warranties and state that confidential information is provided "as is" or without warranties. |

The examples of Table I and Table II provide only a few examples of the types of clauses and contractual terms that may be classified by one or more machine learning models. Indeed, given the large scope a legal contract may cover, a legal contract may include many different types of clauses and contractual terms (see, for example, https://support.ironcladapp.com/hc/en-us/articles/12947738534935, which provides some further examples of clauses and contractual terms that a legal contract may have). In addition to the examples of Table I and Table II, other examples will be apparent based on the below discussion and the accompanying FIGS. 2, 3, 4A-4C, 5A-5C, 6A-6C, 7 and 8. For example, FIG. 6C includes an example of a definition clause, which is another type of clause that one or more machine learning models may classify within a document.

In addition to the examples of Table I and Table II, the one or more machine learning models may be configured to recognize additional contractual terms, classifications, or types. These additional contractual terms, classifications, or types may be defined in various ways. As one example, an additional contractual term, classification, or type may be defined by a human author (e.g., a human user may define a particular contractual term, and provide examples that are added to training data for the one or more machine learning models). As another example, an additional contractual term, classification, or type may be defined based on a set of documents (e.g., each clause in the document may be labeled with a type of contractual term, and both the clause data and the labeled types of contractual terms may be used when training the one or more machine learning models such that the one or more machine learning models are configured to recognize each of the labeled types). As yet another example, an additional contractual term, classification, or type may be defined by a machine learning model (e.g., a machine learning model may be configured to monitor documents, as they are being saved and/or edited, to determine whether a new type of contractual term is included in a document).

As discussed above, the one or more machine learning models may include, or otherwise be, one or more natural language processing models, such as one or more generative language models and/or one or more extractive language models. The one or more extractive language models may be used to classify one or more clauses of the document, recognize contractual terms within the one or more clauses; and the like. The one or more generative language models may be used to generate one or more recommended edits to a clause; generate one or more suggested clauses that are missing from the document data 108; generate one or more suggested locations where a clause (e.g., a suggested clause and/or a clause currently in the document data 108) may be inserted into or moved within the document data 108; and the like. These outputs from the one or more generative language models may be included in the response data 116 and/or used as a basis for determining data included by the response data 116. Indeed, as shown in FIG. 1, the response data 116 includes data indicating one or more suggested clauses (e.g., "[Data indicating suggested clause(s)]") and/or data indicating one or more suggested locations where a clause may be inserted into or moved within the document data 108 (e.g., "[Data indicating location(s) for a clause]"). This data may have been output from the one or more generative language models or may have been determined based on output from the one or more generative language models.

In some arrangements that use one or more extractive language models, the computing platform 104 may determine text that will be used as input to the one or more extractive language models. The text may include a first portion that indicates one or more tasks the one or more extractive language models will perform based on the input (e.g., indicating a task to classify one or more clauses in a document, to recognize one or more contractual terms within a document, and the like); a second portion that is based on the document data 108 (e.g., text of one or more clauses in the document, or a portion of a clause in the document); and a third portion that includes source text for extracting output data of the one or more extractive language models. The source text may be based on the task the one or more extractive language models are to perform. For example, if an extractive language model performs a task to classify one or more clauses, the source text may include a description of the types of clauses and example clause text for the types of clauses. If an extractive language model performs a task to recognize contractual terms in a document, the source text may include a description of the types of contractual terms and example contractual terms for the types of contractual terms. The source text may take the form of one or more documents, one or more tables, or some other suitable format. In some instances, the third portion may include a reference to a storage location of the source text, which allows the one or more extractive language models to access the source text.

The computing platform 104 may determine text that will be used as input to the one or more generative language models. The text may include a first portion that indicates one or more tasks the one or more generative language models will perform based on the input and a second portion that is based on the document data 108. Further, the text may include, or otherwise be based on, output data from one or more extractive language models.

For the first portion of input for one or more generative language models, the one or more tasks may indicate the one or more generative language models may output suggestions of one or more clauses for insertion into the document data 108, may output recommendations of one or more locations to insert into or move within the document data 108, may output recommended edits to one or more clauses within the document data 108, and the like. The first portion may take the form of natural language (e.g., by including text such as "suggest edits to the following clause", "recommend where this clause should be inserted", "where should the following clause be moved", "should any clauses be added", and the like). The exact format and structure of the first portion may depend on which tasks the one or more generative language models are used to perform, the specific configuration of the one or more generative language models, and/or the training of the one or more generative language models. In general, the first portion may include any text suitable for causing the one or more generative language models to provide output responsive to the task. The text that may be included in the first portion may be pre-configured and stored in a database of the computing platform 104 (e.g., the rules repository 104) that maps certain tasks (e.g., suggest edits, suggest clauses, recommend locations) to particular text for inclusion by the first portion. Data indicating which tasks the one or more generative language models are used to perform may be stored as part of the rules repository 124 and/or the form information database 126 and may be configurable by a user (e.g., a user may be able to select whether the one or more generative language models are usable to suggest edits, suggest clauses, and/or recommend locations).

For the second portion of input for one or more generative language models, the second portion may include one or more clauses of the document data 108, an entirety of the document data 108, and/or a modified version of the document data 108. For example, the second portion may be determined based on user input. A user may, via a user interface that displays the document data 108, identify particular clauses, portions, or an entirety of the document data 108 for processing by the one or more generative language models. As one specific example, the user may highlight, by clicking and dragging a mouse cursor, a clause of the document data 108 and select an option that will cause the one or more generative language models to process the highlighted clause. As another specific example, the user may press a button that causes the one or more generative language models to process the entirety of the document data 108. More generally, the user may be able to identify particular clauses, portions, or an entirety of the document data 108 in a way supported by the "AI Assist" feature of software provided by IRONCLAD.

As another example, the second portion may be determined based on the configuration of the one or more generative language models. As one specific example, the document data 108, (or a portion thereof identified by a user, may exceed a maximum size of the input for the one or more generative language models (e.g., GPT-3 has a maximum input size of 2048 tokens and if each token is 4 characters there would be a maximum input size of approximately 1500 words). The document data 108 may be processed, via the document rules and/or workflow rules 114 and/or via another machine-learning model of the one or more machine learning models 110, to determine a subset of clauses that will be included by the second portion and/or to determine a modified version that will be used as input to the one or more generative language models. The modified version may include portions of the document data 108 extracted from multiple clauses, or a condensed version of the contract that is less than the maximum size of the input for the one or more generative language models (e.g., by removing definite and/or indefinite articles from the document data 108 such as "the", "a", "an" and/or by removing conjunctions from the document data 108 such as "or" and "and").

The input to the one or more generative language models may include additional text in addition to the first portion and the second portion discussed above. For example, the input may include a third portion that includes output from one or more extractive language models (e.g., information identifying the types of clauses included in the document data 108 (e.g., an indication of one or more types of clauses, as classified one or more extractive language models, for the one or more clauses included in the second portion). In this way, the input may be based on output from one or more extractive language models. As another example, the input may include a fourth portion that the includes one or more rules from the document rules and/or the workflow rules 114. In this way, the input may include one or more rules that apply to the document data being processed by the one or more generative language models. As another example, the input may include a fifth portion that includes a sample output for the one or more generative language models that, as one specific example, indicates how to show edits to clauses (e.g., via strikethroughs, underlining, etc.). In this way, the input may include an indication of how the output should show suggested edits to clauses.

As some additional examples of the input for a generative language model, the document rules and/or the workflow rules 114 may include conditional rules that apply based on the actual content of certain clauses, and input for the generative language models based on a conditional rule may include at least three portions. As one specific example of a conditional rule, a conditional rule may indicate that a first person is a required approver if the choice of law clause is somewhere in the United States but a second person is a required approver if the choice of law clause is somewhere outside the United States. In this example, the input to the one or more generative language models may include a first portion indicating that the one or more generative language models are to analyze the Governing Law clause based on the conditional rule, a second portion that includes the current text data of the Governing Law clause, and a third portion that includes the conditional rule. Based on this input, the one or more generative language models may provide output that indicates, among other things, which person is required to approve the choice of law clause (e.g., the first person is required to approve the choice of law clause based on the current text data indicating California being the governing law); and which criteria of the conditional rule is satisfied (e.g., the choice of law clause indicates a location within the United States based on the current text data indicating California being the governing law).

As another specific example of a conditional rule, a conditional rule may indicate that a specific person is to approve a clause if the clause includes specific terms. In this example, the input to the one or more generative language models may include a first portion indicating that the one or more generative language models are to analyze the clause based on the conditional rule, a second portion that includes the current text data of the clause, and a third portion that includes the conditional rule. Based on this input, the one or more generative language models may provide output that indicates, among other things, whether the specific person is required to approve the clause (e.g., the first person is required to approve the clause based on the clause including at least one of the specific terms); and whether criteria of the conditional rule is satisfied (e.g., the clause satisfies the criteria based on the clause including at least one of the specific terms). Inclusion of the specific term may be based on an actual match between the specific terms of the conditional rule and the current text data of the clause or may be based on fuzzy language matching between the specific terms of the conditional rule and the current text data of the clause.

As yet another specific example of a conditional rule, a conditional rule may indicate that specific content of a clause is impermissible based on conditional criteria. Such conditional criteria may be based on the content of other clauses (e.g., specific terms of the clause may be impermissible based on the current choice of law), or may be based on another document rule or workflow rule (e.g., specific terms of the clause may be impermissible based on a workflow rule requiring no indemnification). In this example, the input to the one or more generative language models may include a first portion indicating that the one or more generative language models are to analyze the clause based on the conditional rule, a second portion that includes the current text data of the clause and the current text data of any other clause relevant to the conditional rule, and a third portion that includes the conditional rule. Based on this input, the one or more generative language models may provide output that indicates, among other things, an indication that the clause includes impermissible language, and a suggested edit to the impermissible language.

In some variations, the computing platform 104 may access and use various data stored in the databases 106 when determining the input for the one or more generative language models and the one or more extractive language models. For example, the rules repository 124 and/or the form information repository 126 may be accessed to determine which tasks to indicate in the first portion, to determine which clauses to include in the second portion, and/or to determine the modified version of the document data 108 that is included in the second portion. For example, the computing platform 104 may use one or more priority indicators when determining the input. The priority indicators may be associated with one or more of the document rules of the rules repository 124, the workflow rules of the rules repository, the user-configured language of the form information repository 126, the standardized language of the form information repository 126, the user-configured templates of the form information repository 126, the default rules for workflows of the form information repository 126, and the like. In this way, rules, templates, and language may be selected, based on the priority indicators, and used as a basis for determining the input for the one or more genera-tive language models and/or the one or more extractive language models. As one specific example, priority indicators may prioritize user-configured language over standardized language, and the computing platform 104 may modify the input based on this priority (e.g., by including the user-configured language as part of the input).

Once the input is determined, the computing platform 104 may provide the input to the intended natural language processing model for processing (e.g., provide the input to a generative language model or an extractive language model). The one or more natural language processing models may, based on the input, generate output. For example, the output from a generative language model may indicate suggested edits to one or more clauses of the document data 108 (e.g., via strikethroughs and underlining); may indicate one or more suggested clauses to add to the document data 108; may indicate one or more locations where a clause may be inserted into or moved within the document data 108; and the like. The output from an extractive language model may indicate a classification for one or more clauses; may indicate what contractual terms are included in one or more clauses; and the like.

In some arrangements, the output from the one or more generative language models may be used as a basis by the computing platform 104 to determine data included by the response data 116. For example, the computing platform 104 may compare the output from the one or more generative language models to data stored in the form information repository 126 (e.g., compare the output to user-configured and standardized language for documents, compare the output to user-configured templates for creating documents, compare the output to default rules for workflows, and the like). In this way, the computing platform 104 may modify the output from the one or more generative language models based on the user-configured and standardized language for documents, based on the user-configured templates for creating documents, and/or based on default rules for workflows, and the like. As another example, the computing platform 104 may compare the output from the one or more generative language models to data stored in the rules repository 124 (e.g., compare the output to the document rules and/or workflow rules used by the computing platform 104).

Once the response data 116 is provided to the user, the user may be able to review the one or more suggestions and/or recommendations provided based on the output of the one or more generative language models. Upon review, the user may approve or reject the one or more suggestion or recommendation. Accepting a suggestion or recommendation may modify the document data 108 (e.g., by editing the document data 108 according to the accepted suggestion or recommendation). Rejecting a suggestion or recommendation may cause the suggestion or recommendation to disappear from the user interface being displayed to the user. Any acceptance or rejection of a suggestion or recommendation may be used as a basis for modifying how the computing platform 104 determines the input for the one or more natural language processing models. For example, if a user rejects a suggestion to edit a choice of law clause, an indication may be stored that the choice of law clause is no longer to be analyzed by the one or more natural language processing models. In some arrangements, this indication may take the form of a white list or black list of clauses. A white list of clauses may indicate which clauses can be analyzed by the one or more natural language processing models and the choice of law clause may be removed from the white list of clauses. A black list of clauses may indicate which clauses are not to be analyzed by the one or more natural language processing models and the choice of law clause may be added to the black list of clauses. As another example, if a user accepts a suggestion to edit a choice of law clause, an indication may be stored to ensure one or more additional clauses (e.g., a venue clause) are analyzed by the one or more natural language processing models.

FIG. 2 depicts an example display screen 200 that may be displayed on a user device (e.g., user device 102) based on the response data 116 being received by the user device from the computing platform 116. In particular, FIG. 2 depicts a first portion 201 of a display screen that includes clauses for a contract (e.g., clauses 11.5 to 12.5 of the contract), and a second portion 202 of the display screen entitled "Playbook" (e.g., because the display screen is for software provided by IRONCLAD that includes a Playbook feature). This second portion visually depicts data of the response data 116 that was sent from the computing platform 104. The response data 116 may have been determined and sent from the computing platform 104 based on ingestion of the contract, based on edits to the contract, based on opening the contract at the user device, and the like. The response data 116 may have been determined by the computing platform 104 based on use of the one or more machine learning models 110, and application of the document rules and/or the workflow rules 114.

As depicted in FIG. 2, the second portion of the display screen shows, at item 205, that a non-solicitation clause has been recognized in the contract, that the non-solicitation clause includes non-standard language (e.g., "CUSTOM" language, as depicted in FIG. 2), that there are no recommended edits to the non-solicitation clause because such a clause is not permitted for this type of contract, and that at least one other reviewer has not approved the non-solicitation clause.

As also depicted in FIG. 2, the second portion of the display screen shows, at item 210, that a governing law clause has been recognized in the contract, that the governing law clause includes non-standard language, and that the governing law clause has been approved.

As also depicted in FIG. 2, the second portion of the display screen shows, at item 215, that a term clause has been recognized in the contract, that the term clause includes standard language, and that the term clause has been approved.

As also depicted in FIG. 2, the second portion of the display shows, at item 220, that a counterpart clause has been recognized in the contract, that the counterpart clause includes non-standard language, and that the governing law clause has been approved.

FIG. 3 depicts a portion of an example display screen 300 that may be displayed on a user device (e.g., user device 102) based on the response data 116 being received by the user device from the computing platform 116. In particular, FIG. 3 depicts a portion of a display screen that visually depicts the response data 116 that was sent from the computing platform 104. The response data 116 may have been determined and sent from the computing platform 104 based on ingestion of a document, based on an attempt to open the document at the user device, based on an attempt to close the document at the user device, based on opening an application that provides the display screen on the user device, based on a user logging into the application, based on a user being added as a reviewer to workflow of the document, and the like. The response data 116 may have been determined by the computing platform 104 based on use of the one or more machine learning models 110, and application of the document rules and/or the workflow rules 114.

As depicted in FIG. 3, the portion of the display screen indicates, at item 305, that the document includes clauses that need review, includes a user-selectable button 310 to allow direct access to at least one of the clauses that need review, and includes a user-selectable link 315 to open the document. The user selectable link also indicates the filename of the document.

As also depicted in FIG. 3, the portion of the display screen indicates, at item 320, which reviewers have been added to the workflow of the document and still need to approve the document (e.g., 0 of 3 have approved the document, as indicated by FIG. 3). For example, the portion of the display screen indicates that Lindsay Wheeler is a reviewer based on their status as finance approver and the inclusion of a clause that requires finance approval. The portion of the display screen indicates that Alan Li is a reviewer based on their status of clause approver of non-solicitation clauses and the inclusion of a non-solicitation clause in the document. The portion of the display screen indicates that Grace Muller is a reviewer based on their status of workflow owner (e.g., a workflow rule may exist that requires a workflow owner to approve the document before the workflow can be completed).

Figure 4A:
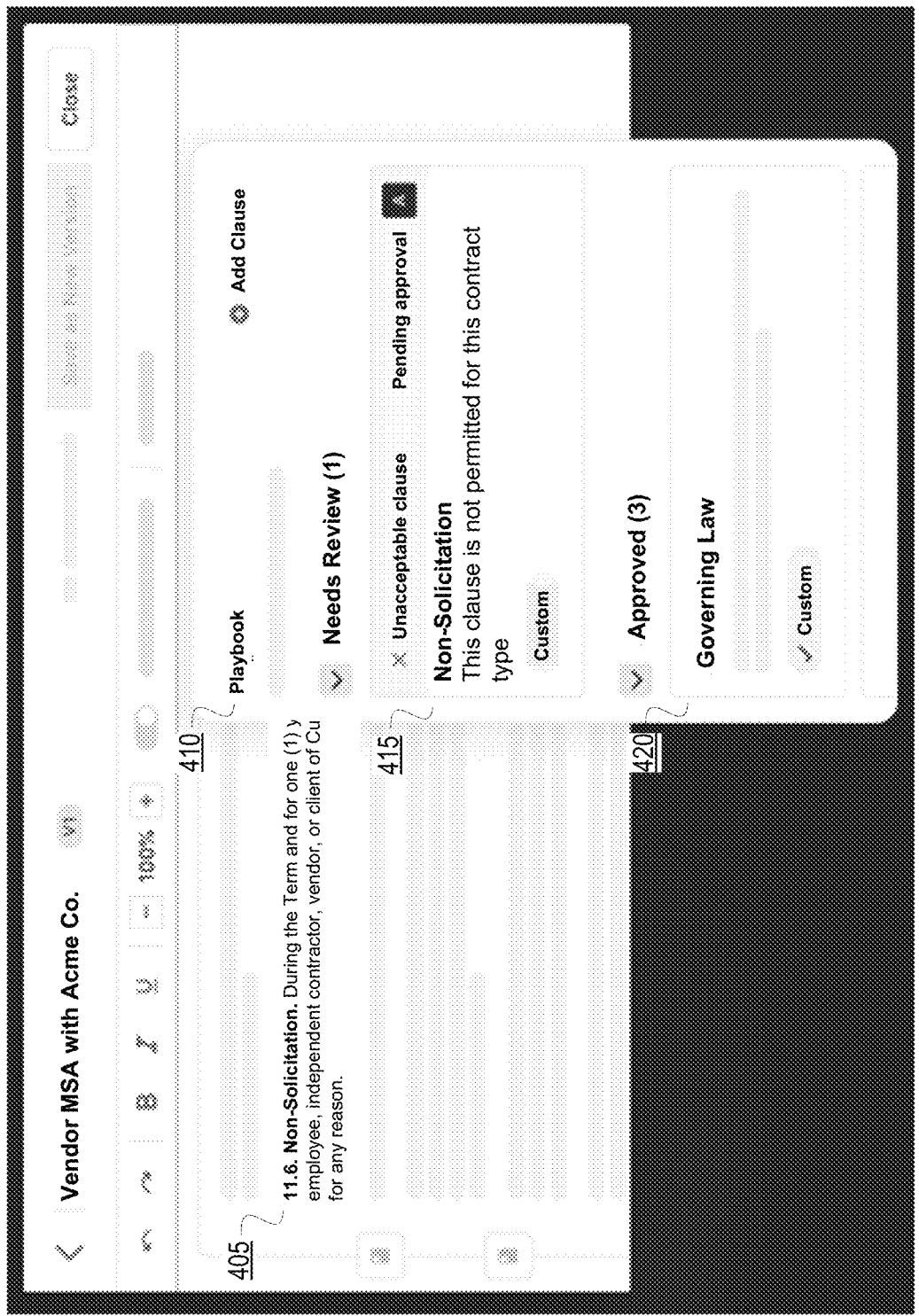
FIGS. 4A-4C depict further examples of display screens that may be displayed on a user device according to one or more aspects described herein.
Figure 4B:
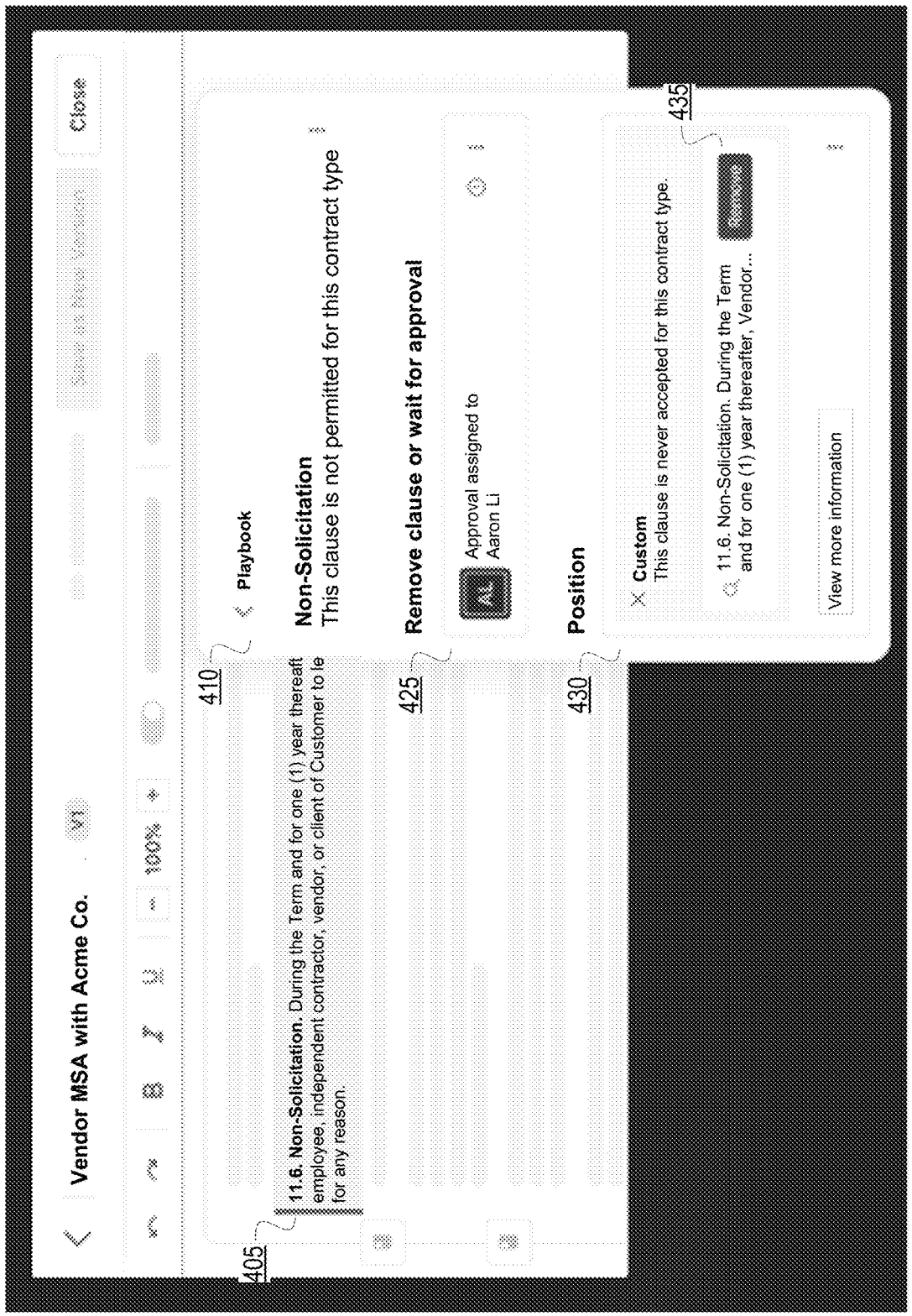
Figure 4C:
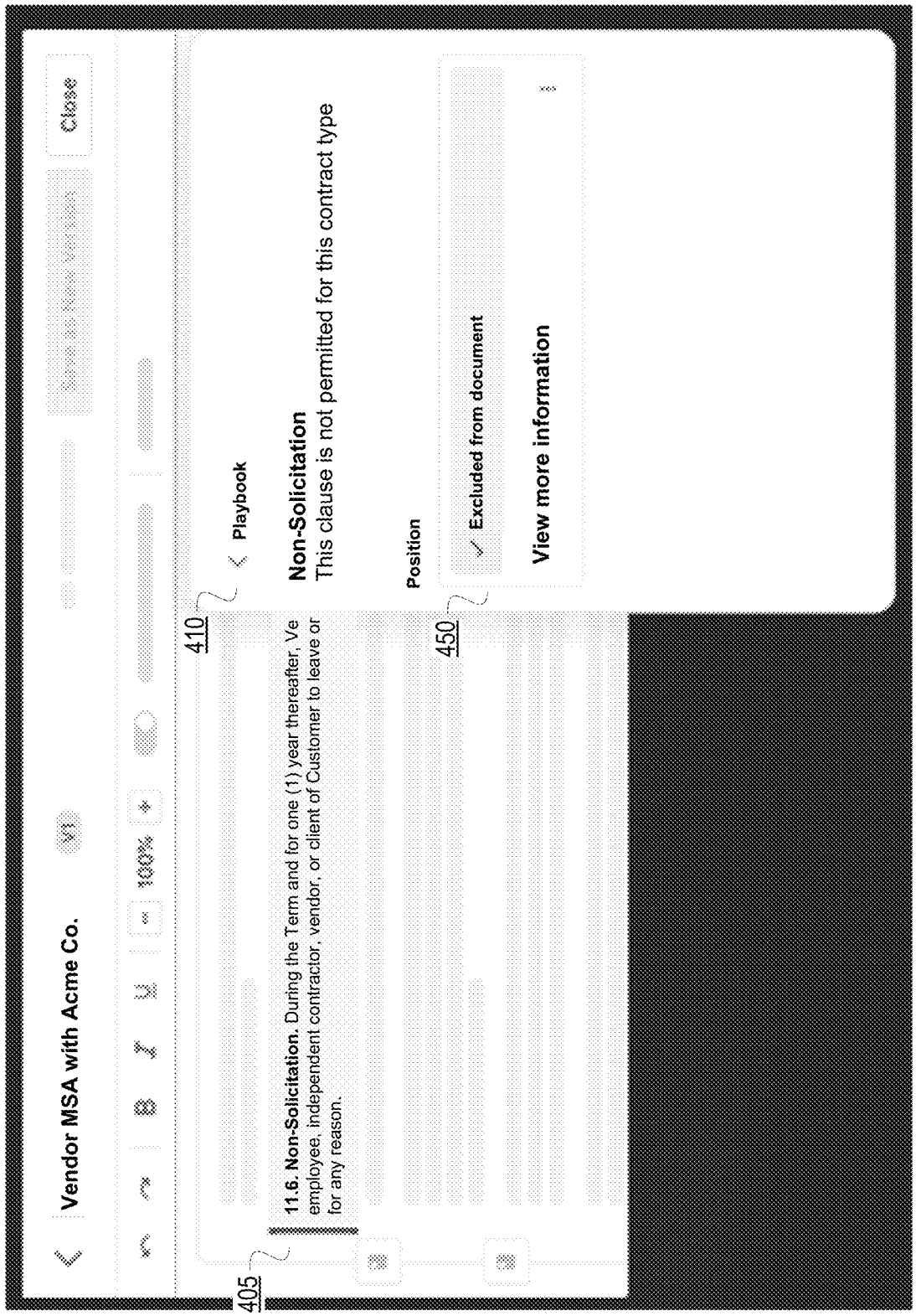

FIGS. 4A-4C depicts example display screens that may be displayed on a user device (e.g., user device 102) based on multiple instances of response data being received by the user device from the computing platform 104. In other words, the response data 116 may be sent multiple times to the user device as part of a process that displays the example display screens illustrated by FIGS. 4A-4C. In particular, FIGS. 4A-4C depict a first portion 405 of a display screen that includes a clause for a contract (e.g., clause 11.6 of the contract), and a second portion 410 of the display screen entitled "Playbook" (e.g., because the display screen is for software provided by IRONCLAD that includes a Playbook feature). This second portion visually depicts the response data that was sent from the computing platform.

FIGS. 4A-4C depict changes to the first portion and second portion of the display screen as the user interacts with the second portion of the display screen. The display screen shown in FIG. 4A may have been displayed based on first response data being received from the computing platform. The display screen shown in FIG. 4B may have been displayed based on the user interacting with the display screen of FIG. 4A and based on second response data being received from the computing platform. The second response data may have been determined and sent by the computing platform based on the computing platform receiving document data that was the result of the user's interaction with the display screen of FIG. 4A. The display screen shown in FIG. 4C may have been displayed based on the user interacting with the display screen of FIG. 4B and based on third response data being received from the computing platform. The third response data may have been determined and sent by the computing platform based on the computing platform receiving document data that was the result of the user's interaction with the display screen of FIG. 4B. The first, second, and third response data may have been determined by the computing platform 104 based on use of the one or more machine learning models 110, and application of the document rules and/or workflow rules 114.

As depicted in FIG. 4A, the second portion 410 of the display screen shows, at item 415, that a non-solicitation clause has been recognized in the contract, that the non-solicitation clause includes non-standard language (e.g., "CUSTOM" language, as depicted in FIG. 4A), that there are no recommended edits to the non-solicitation clause because such a clause is not permitted for this type of contract, and that at least one other reviewer has not approved the non-solicitation clause.

As also depicted in FIG. 4A, the second portion 410 of the display screen shows, at item 420, that a governing law clause has been recognized in the contract, that the governing law clause includes non-standard language, and that the governing law clause has been approved.

As depicted in FIG. 4B, the first portion 405 of the display screen highlights the non-solicitation clause. The second portion 410 of the display screen indicates, at item 425, that approval for the non-solicitation clause is assigned to Aaron Li. The second portion 410 of the display screen also indicates, at item 430, that a document rule and/or a workflow rule exists for non-solicitation clauses and indicates that non-solicitation clauses are never accepted for this contract type. The second portion 410 of the display screen also includes a user-selectable button 435 with a recommended edit to the non-solicitation clause. That recommended edit is to remove the non-solicitation clause from the contract.

As depicted in FIG. 4C, the first portion 405 of the display screen highlights the non-solicitation clause and indicates (e.g., by changing the color of the highlighting) that the clause has been edited such that it is deleted from the contract. The second portion 410 of the display screen indicates, at item 450, that the edit to remove the non-solicitation clause from the contract has resolved the need to review the non-solicitation clause.

Figure 5A:
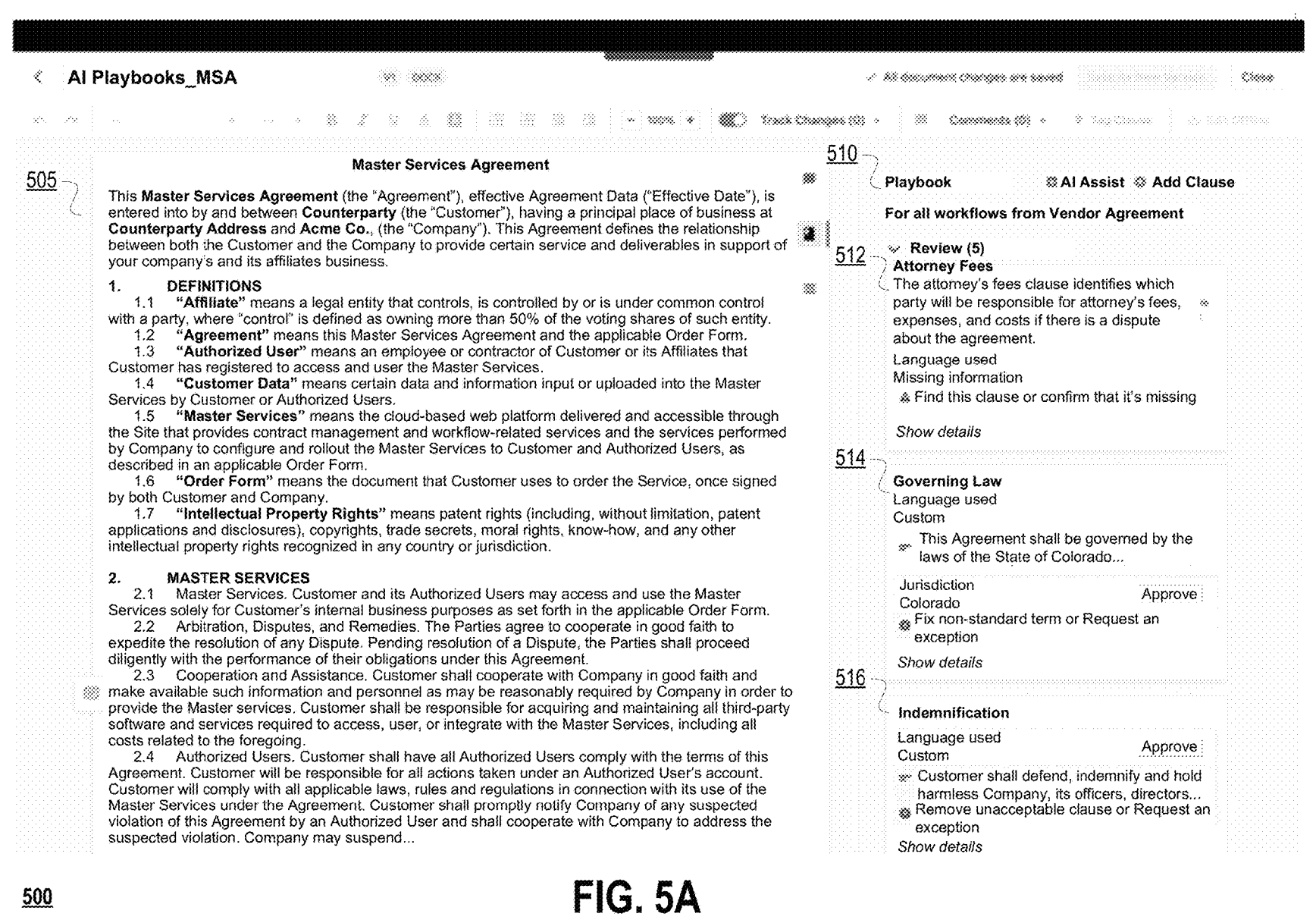
Figure 5B:
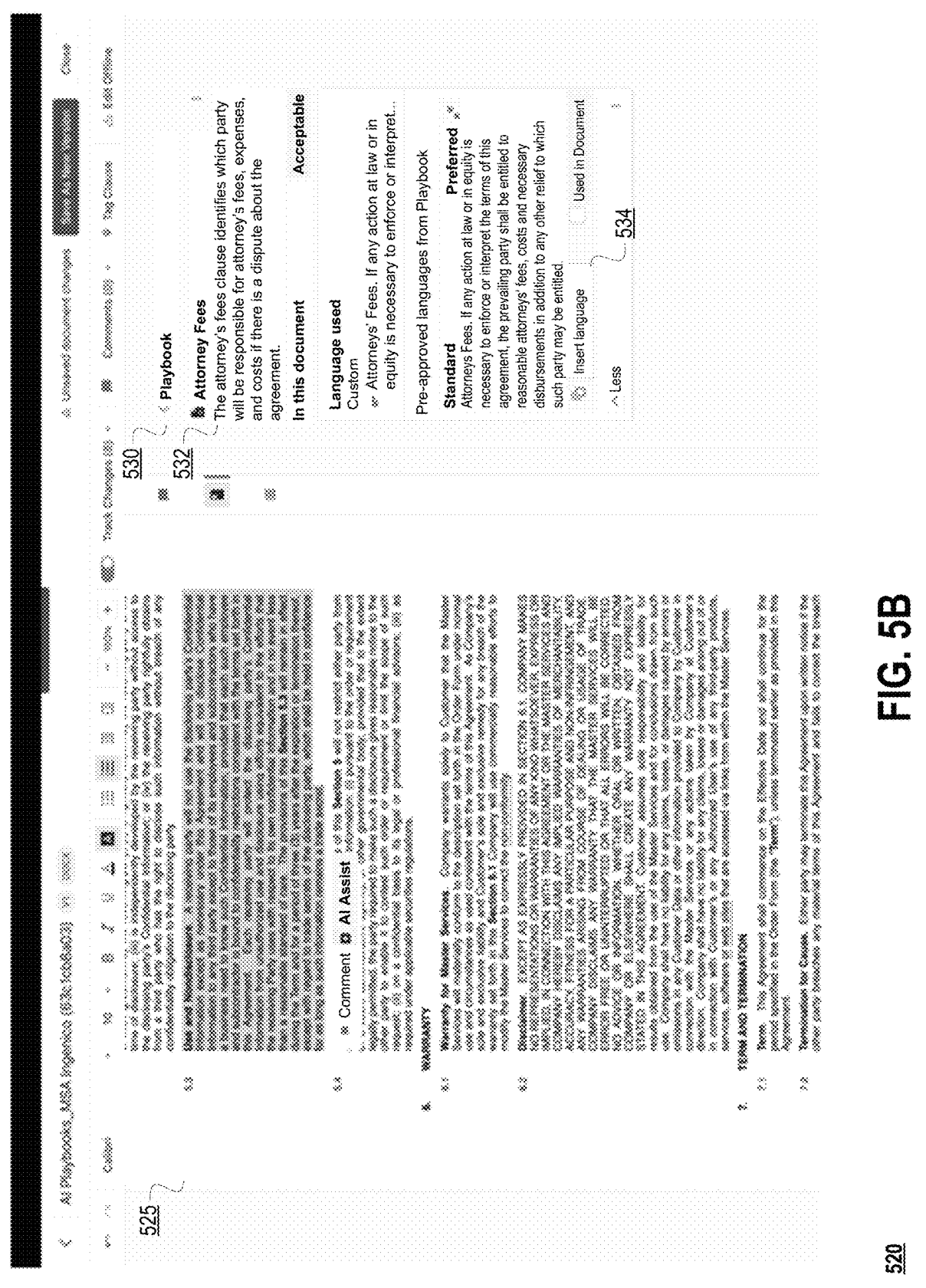

FIGS. 5A-5C depict example display screens that may be displayed on a user device (e.g., user device 102) based on output from one or more natural language processing models (e.g., one or more generative language models and/or one or more extractive language models). The display screen 500 shown in FIG. 5A may have been displayed based on the user selecting a menu option or pressing a button to analyze the displayed document using the one or more natural language processing models and based on at least first response data being received from the computing platform after the one or more natural language processing models have processed the entirety of the document or portions thereof. The menu option or button may be in support of an AI Assist feature provided by IRONCLAD software that causes document data 108 to be processed by the one or more natural language processing models based on a user's single click. The display screen 520 shown in FIG. 5B may have been displayed based on the user highlighting the clause titled "Use and Nondisclosure" and selecting the "AI Assist" option that pops up after the user has performed the highlighting and based on at least second response data being received from the computing platform after the one or more natural language processing models have processed at least the highlighted clause. The display screen 540 shown in FIG. 5C may have been displayed based on the user selecting a menu option or pressing a button to analyze the displayed document using the one or more natural language processing models and based on at least third response data being received from the computing platform after the one or more natural language processing models have processed the entirety of the document or portions thereof.

To generate these example display screens 500, 520, 540 of FIGS. 5A-5C, the one or more natural language processing models may have generated or extracted output multiple times based on multiple inputs. For example, each suggestion or recommendation shown by the display screens of FIGS. 5A-5C may be the result of the one or more natural language processing models analyzing a single clause of the document. With respect to the display screen 560 of FIG. 5C, the computing platform may determine input for the "Governing Law" clause and provide that input to the one or more generative language models. The one or more generative language models may process that input to generate the suggested edit that changes "Colorado" to "California". Similarly, the computing platform may determine input for each of the "Indemnification" clause, the "Non-Solicitation" clause, the "Payment Description" clause, and the "Attorney Fees" clause, and may provide each input to the one or more generative language models such that the suggested edits to those clauses are generated as output by the one or more generative language models. As another example, input may be determined for each task the one or more generative language models are to perform. Based on the display screen 560 of FIG. 5C, the tasks may include at least a first task to suggest edits to clauses (e.g., as shown by the edits to the "Governing Law" clause) and a second task to suggest clauses to insert into the document (e.g., as shown by the "Attorney Fees" clause). Accordingly, the computing platform may determine a first input for the first task and a second input for the second task, and provide them to the one or more generative language models. The one or more generative language models may process the first input to generate one or more of the suggested edits shown by the example display screen of FIG. 5C (e.g., the suggested edit that changes "Colorado" to "California"). The one or more generative language models may process the second input to generate other suggested edits shown by the example display screen of FIG. 5C (e.g., the insertion of the "Attorney Fees" clause to the document).

As depicted in FIG. 5A, a first portion 505 of the display screen displays the document and a second portion 510 of the display screen displays suggestions and recommendations generated by the one or more generative language models. In particular, the second portion 510 of the display screen indicates, at item 512, that the "Attorney Fees" clause is missing information. This indication may have been determined by the computing platform based on a recommended edit output by the one or more generative language models for the "Attorney Fees" clause. The recommended edit for the "Attorney Fees" clause may be shown by pressing the "Show details" option under the "Attorney Fees" review section. An example of a recommended edit that may be output by the one or more generative language models for the "Attorney Fees" clause is shown in FIG. 5C.

As also depicted in FIG. 5A, the second portion 510 of the display screen indicates, at item 514, that the "Governing Law" clause has non-standard (or custom) language. This indication may have been determined by the computing platform based on a recommended edit output by the one or more generative language models for the "Governing Law" clause. The recommended edit for the "Governing Law" clause may be shown by pressing the "Show details" option under the "Governing Law" review section. An example of a recommended edit that may be output by the one or more generative language models for the "Governing Law" clause is shown in FIG. 5C.

As also depicted in FIG. 5A, the second portion 510 of the display screen also indicates, at item 516, that the "Indemnification" clause has non-standard (or custom) language. This indication may have been determined by the computing platform based on a recommended edit output by the one or more generative language models for the "Indemnification" clause. The recommended edit for the "Indemnification"

clause may be shown by pressing the "Show details" option under the "Indemnification" review section. An example of a recommended edit that may be output by the one or more generative language models for the "Indemnification" clause is shown in FIG. 5C.

As depicted in FIG. 5B, a first portion 525 of the display screen displays the document with the user having highlighted the "Use and Nondisclosure" clause. A second portion 530 of the display screen displays suggestions and recommendations generated by the one or more generative language models. In particular, the second portion 530 of the display screen indicates, at item 532, that the "Attorney Fees" includes non-standard (or custom) language. In particular, the second portion 530 of the display screen indicates, at item 532, that the "Attorney Fees" clause is missing information. This indication may have been determined by the computing platform based on a recommended edit output by the one or more generative language models for the "Attorney Fees" clause. As also shown by the second portion of the recommended edit for the "Attorney Fees" clause, the recommended edit is "Attorneys' Fees. If any action at law or in equity is necessary to enforce or interpret the terms of this Agreement, the prevailing party shall be entitled to reasonable attorneys' fees, costs and necessary disbursements in addition to any other relief to which such party may be entitled." The second section also includes a user-selectable option, at item 534, to insert the recommended edit.

As depicted in FIG. 5C, an overlay 570 is displayed as being on top of a document 565 and the overlay 570 includes suggestions or recommendations for five different clauses: a "Governing Law" clause at item 572, an "Indemnification" clause at item 574, a "Non-Solicitation" clause at item 576, "a "Payment Description" clause at item 578, and an "Attorney Fees" clause at item 580. Each of the suggestions or recommendations may have been output by the one or more generative language models. As displayed in FIG. 5C, the recommended edit to the "Governing Law" clause at item 572 is to change "Colorado" to "California". The recommended edit to the "Indemnification" clause at item 574 is to delete the entirety of the clause. The recommended edit to the "Non-Solicitation" clause at item 576 is to delete the entirety of the clause. The recommended edit to the "Payment Description" clause at item 578 is to change "thirty (30)" to "forty-five (45). The recommended edit to the "Attorney Fees" clause at item 580 is to insert the clause with the following language: "Attorneys' Fees. If any action at law or in equity is necessary to enforce or interpret the terms of this Agreement, the prevailing party shall be entitled to reasonable attorneys' fees, costs and necessary disbursements in addition to any other relief to which such party may be entitled."

In addition to the one or more generative language models discussed in connection with FIGS. 5A-5C, the display screens of FIGS. 5A-5C may be based on using one or more extractive language models. For example, as part of determining the suggestions and recommendations displayed by the display screens of FIGS. 5A-5C, the computing platform may perform tasks to classify one or more clauses and/or recognize contractual terms within one or more clauses. In this way, the computing platform may use the one or more extractive language models to perform those tasks and use output from the one or more extractive language models as a basis for input to the one or more generative models. Some further details on using output from the one or more extractive language models as a basis for input to the one or more generative models will be discussed in FIGS. 6A-6C and may be performed similarly to generate the suggestions and recommendations of FIGS. 5A-5C.

FIGS. 5B and 5C illustrate some of the ways in which a user may initiate the "AI Assist" feature for one or more clauses of a document. As depicted in FIG. 5B, the user has highlighted the use and non-disclosure clause and the computing platform has caused display of an option for "AI Assist". The user may be able to press the option for "AI Assist". After the user presses the option for "AI Assist", the computing platform may use one or more machine learning models to analyze the highlighted clause and cause display of any suggested edits or recommendations for the highlighted clause.

As illustrated by FIG. 5C, the user may have pressed an option for "AI Assist" that causes the entirety of the document to be analyzed using one or more machine learning models. In this way, FIG. 5C depicts an overlay 570 that shows suggested edits and recommendations for the entirety of the document.

The examples of highlighting a clause and pressing a presented "AI Assist" option to analyze the clause, as depicted in FIG. 4B, and of pressing an option that causes an entirety of a document to be analyzed are only two of the ways in which the "AI Assist" option can be initiated by the user. In general, the "AI Assist" may be initiated in the following manner. The computing platform may receive user input that indicates at least a portion of a document. The user input may include a user highlighting a portion of a clause, an entirety of a clause, or plural clauses. The user input may include a press of a user interface button that causes a portion of a document (e.g., a highlighted portion) or an entirety of a document (e.g., as discussed in connection with FIG. 5C) to be analyzed by one or more machine learning models. Based on the user input, the computing platform may cause the indicated portion of the document or the entirety of the document to be analyzed using the one or more machine learning models. After the indicated portion of the document or the entirety of the document has been analyzed using the one or more machine learning models, the computing platform may cause display of any suggested edits or recommendations for the highlighted clause. The analysis using the one or more machine learning models and the causing display of any suggested edits or recommendations may be performed similar to the examples discussed in connection with FIGS. 1, 2, 3, 4A-4C, 5A-5C, 6A-6C, 7, and 8.

In view of the above examples and FIGS. 5A-5C, one or more natural language processing models, such as one or more generative language models and/or one or more extractive language models, may be used to provide suggestions and recommendations to users within a workflow. Use of the one or more natural language processing models may improve workflow processes in many ways. For example, the one or more natural language processing models may be used to identify clauses that include non-standard language that may be unapproved by others in the workflow and ensure that language of the document complies with the document and workflow rules. Further use of the one or more natural language processing models may speed up the document review process by identifying irregularities in language within the document in an automated fashion that may avoid the need to perform a more lengthy manual review. A suggestion or recommendation output by one or more generative language models may be based on pre-existing rules and templates (e.g., rules and/or templates in support of a "Playbook" feature provided by IRONCLAD software) and serve as a way to ensure preferred document language is used across many documents.

Further, while FIGS. 5A-5C illustrate some ways in which the one or more natural language processing models may be used to provide suggestions and recommendations to users within a workflow, there are many other ways in which one or more natural language processing models may be used to provide suggestions and recommendations. For example, the one or more natural language processing models may be used to provide real-time feedback and suggestions to a user as the user edits a document. In this way, the user will not have to click an "AI Assist" option (e.g., as discussed in connection with FIGS. 5A-5C) and, instead, will be presented with edits and suggestions as the document is edited. For example, as a user edits a document, current edits may be used a basis for determining input to the one or more natural language processing models. For example, as a user edits a choice of law clause, the current text of the choice of law clause may be provided to the one or more natural language processing models as input. For some edits, the one or more natural language processing may output data that is used as a basis for causing display (e.g., via the response data 116 of FIG. 1) of a visual indicator on a user interface via which the user is editing the document. The user, based on the visual indicator, will be able to view the suggestion generated based on the current edit and decide how to proceed.

Figure 6B:
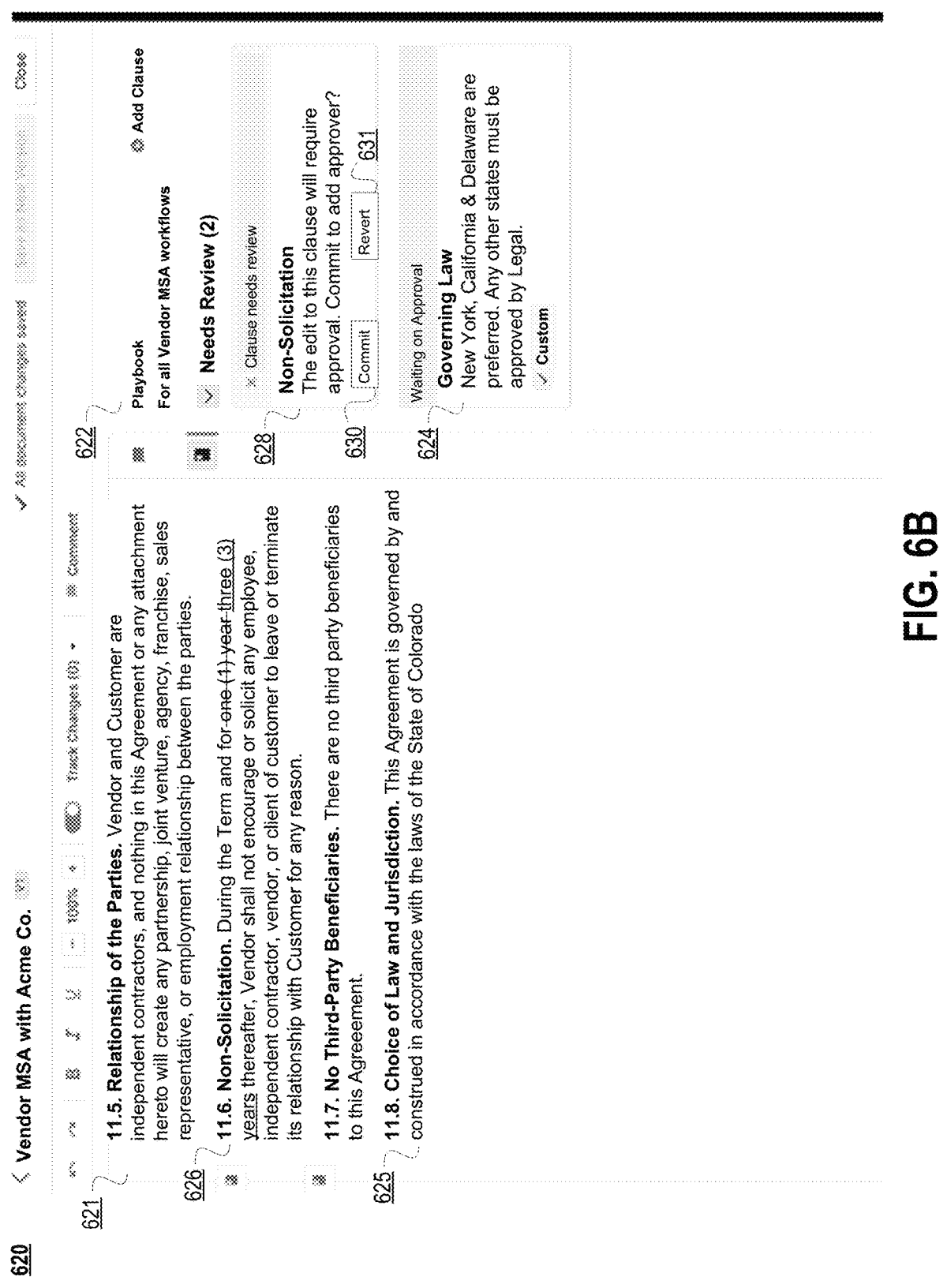

FIGS. 6A-6C depict example display screens that may be displayed on a user device (e.g., user device 102) as a user's edits are provided to one or more natural language processing models (e.g., one or more generative language models and/or one or more extractive language models). In other words, FIGS. 6A-6C depict example display screens 600, 620, 640 that show suggestions based on output from the one or more natural language processing models in real-time as a user edits a document. To generate these example display screens 600, 620, 640 of FIGS. 6A-6C, the one or more natural language processing models may have generated or extracted output multiple times based on multiple inputs. For example, each suggestion or recommendation shown by the display screens 600, 620, 640 of FIGS. 6A-6C may be the result of the one or more natural language processing models processing different edits of the document. In general, FIGS. 6A-6C show some of a user's edits over a single editing session with the edits of FIG. 6A occurring before the edits of FIG. 6B, and the edits of FIG. 6B occurring before the edits of FIG. 6C. Accordingly, each display screen 600, 620, 640 includes a first portion, which shows the document being edited, and a second portion, which shows a real-time visual indication of suggestions based on the one or more natural language processing models.

As depicted in FIG. 6A, a first portion 601 of the display screen 600 displays the document and a second portion 602 of the display screen 600 displays suggestions and recommendations generated based on using the one or more natural language processing models. In particular, the second portion 602 indicates the Governing Law clause needs review (e.g., clause 11.8 titled "Choice of Law and Jurisdiction"). The Governing Law clause needs review based on the user having edited the document, as illustrated at item 606, to indicate "Colorado" as the choice of law.

Based on this edit, two or more natural language processing models may be used to determine whether to display a suggestion or recommendation. For example, the edited contractual term may be classified by sending first input to an extractive language model. This first input may include a first portion that indicates a task to classify the clause; and a second portion that includes the text of the clause (e.g., "11.8. Choice of Law and Jurisdiction. This Agreement is governed by and construed in accordance with the laws of the State of Colorado"), and a third portion that includes source text for classifying one or more clauses. Based on the first input, the extractive language model may indicate the clause is classified as a Governing Law clause. Based on this classification, the edit may be further processed by a generative language model (e.g., as part of determining response data that indicates a suggestion or recommendation based on the generative language model). This further processing may include sending second input to the generative language model. This second input may include a first portion that indicates a task to recommend an edit to the Governing Law clause based on one or more rules; a second portion that includes the text of the clause (e.g., "11.8. Choice of Law and Jurisdiction. This Agreement is governed by and construed in accordance with the laws of the State of Colorado"); a third portion that includes the classification of the clause as determined by the extractive language model (e.g., an indication of a classification of Governing Law clause); and a fourth portion that includes one or more document or workflow rules associated with the Governing Law clause (e.g., a rule indicating which jurisdictions are preferred). In some instances, the one or more document or workflow rules associated with the Governing Law clause may include user-configured language for the Governing Law clause. Based on the second input, the generative language model may output a suggested edit to the clause (e.g., based on Colorado not being one of the preferred jurisdictions) and, as a result, the display screen shows a visual indication of the suggestion at item 605. The suggested edit indicates that New York, California and Delaware are preferred as the states for choice of law clauses and also indicates that any state other than New York, California and Delaware need approval by a third-party approver. The indication that New York, California and Delaware are preferred as the states for choice of law clauses may be based on the one or more document or workflow rules associated with the Governing Law clause (e.g., based on the user-configured language included in such rules). If the user wants to approve Colorado as the governing law, the user is able to request approval by clicking button 607 to request approval. Otherwise, the user is able to edit the document to one of the preferred states (e.g., California or Delaware), which may cause the visual indication at 605 to disappear from the display screen.

As depicted in FIG. 6B, a first portion 621 of the display screen 620 displays the document and a second portion 622 of the display screen 620 displays suggestions and recommendations generated based on using the one or more natural language processing models. In particular, the second portion 622 indicates, at item 624, that the Governing Law clause (e.g., clause 11.8 titled "Choice of Law and Jurisdiction") is waiting on approval from a third-party approver for Colorado as the chosen state. As indicated at item 626, the user has also edited clause 11.6 by changing a one-year non-solicitation term to a three-year non-solicitation term. Based on this edit, two or more natural language processing models may be used to determine whether to display a suggestion or recommendation. For example, the edited contractual term may be classified by sending first input to an extractive language model. This first input may include a first portion that indicates a task to classify the clause; a second portion that includes the text of the clause (e.g., "11.6. Non-Solicitation. During the Term and for three (3) years thereafter, Vendor shall not encourage or solicit any employee, independent contractor, vendor, or client of customer to leave or terminate its relationship with Customer for any reason."); and a third portion that includes source text for classifying one or more clauses. Based on the first input, the extractive language model may indicate the clause is classified as a non-solicitation clause. Based on this classification, the edit may be further processed by a generative language model (e.g., as part of determining response data that indicates a suggestion or recommendation based on the generative language model). This further processing may include sending second input to the generative language model. This second input may include a first portion that indicates a task to recommend an edit to the non-solicitation clause based on one or more rules; a second portion that includes the text of the clause (e.g., "11.6. Non-Solicitation. During the Term and for three (3) years thereafter, Vendor shall not encourage or solicit any employee, independent contractor, vendor, or client of customer to leave or terminate its relationship with Customer for any reason."); a third portion that includes the classification of the clause as determined by the extractive language model (e.g., an indication of a classification of non-solicitation clause); and a fourth portion that includes one or more document or workflow rules associated with the non-solicitation clause (e.g., an rule indicating if edits to non-solicitation clause require approval). Based on the second input, the generative language model may output a suggested edit to the clause (e.g., based on edits to non-solicitation clauses requiring approval) and, as a result, the display screen shows a visual indication of the suggestion at item 628. If the user wants to make the edit, the user is able to commit the edit to the document by pressing button 630, which will also request approval. Otherwise, the user is able to revert the clause to the unedited state by pressing button 631, which removes the need for approval.

As depicted in FIG. 6C, a first portion 641 of the display screen 640 displays the document and a second portion 642 of the display screen 640 displays suggestions and recommendations generated based on using the one or more natural language processing models. In particular, the second portion 642 indicates, at items 645 and 650, two different suggestions based on the user adding clauses 12 and 12.1 to the document (e.g., the user may have pasted the text in from a clipboard). Based on this edit, two or more natural language processing models may be used to determine whether to display the suggestions or recommendations. For example, the added contractual terms may be classified by sending first input to an extractive language model. This first input may include a first portion that indicates a task to classify the clauses; a second portion that includes the text of the clauses (e.g., "12. Definitions. 12.1. "Customer Data" means any data, information or material processed or stored by Customer in the Platform."); and a third portion that includes source text for classifying one or more clauses. Based on the first input, the extractive language model may indicate the clauses are classified as definition clauses. Based on these classifications, the edit may be further processed by a generative language model (e.g., to determine response data that indicates a suggestion or recommendation based on the generative language model). This further processing may include sending second input to the generative language model. This second input may include a first portion that indicates a task to check previous documents for similar definition clauses; a second portion that includes the text of the clause (e.g., "12. Definitions. 12.1. "Customer Data" means any data, information or material processed or stored by Customer in the Platform."); and a third portion that includes text data from definition clauses retrieved from one or more previous documents (e.g., definition clauses of at least ten previous documents may be included). Based on the second input, the generative language model may output a suggestion that indicates the definition for "Customer Data" has been added to at least a threshold number of the previous documents (e.g., at least 5 of the previous 10 documents have a "Customer Data" definition that the second generative model considers to match with the "Customer Data" definition added by the user) and, as a result, the display screen shows a visual indication of the suggestion at item 650. If the user wants to add a rule to the document and/or workflow rules (e.g., the document and/or workflow rules 114 of FIG. 1), the user is able to press button 652, which will add a rule indicating that the "Customer Data" definition is a preferred inclusion to documents with the definition clause. If the user wants to create a template based on the suggestion, the user is able to press button 654. The template may include a copy of the current document and/or workflow rules that are being applied to the document being edited and an added rule indicating that the "Customer Data" definition is a preferred inclusion to documents with the definition clause. This template can be selected by users in the future when creating a document and/or changing the set of document and/or workflow rules being applied to a document being edited.

Additionally, based on the classification of clauses changing from a non-solicitation clause (as classified based on the edit discussed in connection with FIG. 6B) to a definition clause (as classified based on the edit discussed in connection with FIG. 6C), the edit may be further processed to determine response data that indicates a suggestion or recommendation based on other generative language models. This further processing may include sending input to other generative language models to determine what clauses are often included with non-solicitation clauses, whether the document being edited includes those clauses, and what language should be used for any of those clauses missing from the document. As depicted in FIG. 6C, a suggestion based on the other generative language models is displayed at item 645. Based on output data from the other generative language models, a determination has been made that a severability clause is often included with non-solicitation clauses (e.g., by a workflow rule, or based on a threshold of documents including both a non-solicitation clause and a severability clause); another determination has been made that a severability clause is not currently included in the document being edited; and a further determination has identified default language for a severability clause (e.g., based on a workflow rule, or based on non-severability clauses of previous documents). If the user wants to add a severability clause with the identified language to the document, the user is able to press button 646. If the user does not want to add the severability clause, the user is able to press button 648.

The suggestions and recommendations 645 and 650 depicted in FIG. 6C illustrate examples how generative models can operate over different levels of a document. In particular, the suggestions and recommendations 645 and 650 depicted in FIG. 6C show how generative models may operate over two or more documents (e.g., by receiving clauses, often of the same type, from two or more documents).

While the examples of FIGS. 5A-5C and FIGS. 6A-6C depict examples that suggest edits and recommendations to a user, the one or more natural language processing models may process certain clauses and/or edits and the result may be that no visual indicator is show to the user. For example, based on an extractive language model classifying a clause as a governing law clause and based on a generative language model processing the clause based on the classification as a governing law clause, the computing platform may determine that the language of the clause matches, or is sufficiently similar to, user-configured language for governing law clauses. In other words, the computing platform may have determined, based on the processing by the extractive language model and the generative language model, that the language of the clause is approved for use within the document. Based on determining that the language of the clause is approved for use within the document, the computing platform may determine to skip (e.g., not perform) steps where response data is determined to indicate the language of the clause is approved for use within the document and where such response data would be sent to a user device. Consequently, by skipping those steps, a visual indicator that the language of the clause is approved for use within the document may not be displayed.

Further, while FIGS. 5A-5C and FIGS. 6A-6C illustrate some ways in which the one or more natural language processing models may be used to provide suggestions and recommendations to users within a workflow, there are many other ways in which one or more natural language processing models may be used to provide suggestions and recommendations. For example, in arrangements where versions of a document are stored, two different versions of the document may be analyzed by one or more natural language processing to determine a summary of edits made between the two versions (e.g., a display screen similar to FIG. 5C may be displayed with the summary). As another example, one or more natural language processing may be used to identify groups of clauses (e.g., based on the content of the clauses and/or the location of the clauses in the document). An identified group of clauses may be used as part of a process for suggesting ways in which clauses within a document can be reordered. As a further example, one or more natural language processing models may be used to determine a suggestion that the counterparty will likely accept. A suggestion that the counterparty will likely accept may include language from a document that both parties have signed. One or more natural language processing models may be used to determine one or more legal conclusions of the clauses. A legal conclusion may be to identify which party is favored by a clause, or to identify a level of impact an edit has to a legal position (e.g., inclusion of the word "not" may have a large impact to a legal position, while changing a length of time from seven days to ten days may not have a large impact to a legal position). One or more natural language processing models may be used to recommend a change in a priority indicator (e.g., suggest a priority indicator be raised in priority to prioritize user-configured language over standardized language, or suggest a priority indicator be lowered in priority to prioritize standardized language over user-configured language).

Even further, FIGS. 5A-5C and FIGS. 6A-6C illustrate some ways in which a workflow may be changed. For example, as depicted in FIG. 6A, if a user presses button 607 to request approval to the governing law clause, the workflow for the document may be changed by adding a person that is required to approve the clause. As another example, as depicted in FIG. 6B, if a user commits the edit to the non-solicitation clause by pressing button 630, the workflow may be changed by adding a person that is required to approve the edit.

Figure 7:
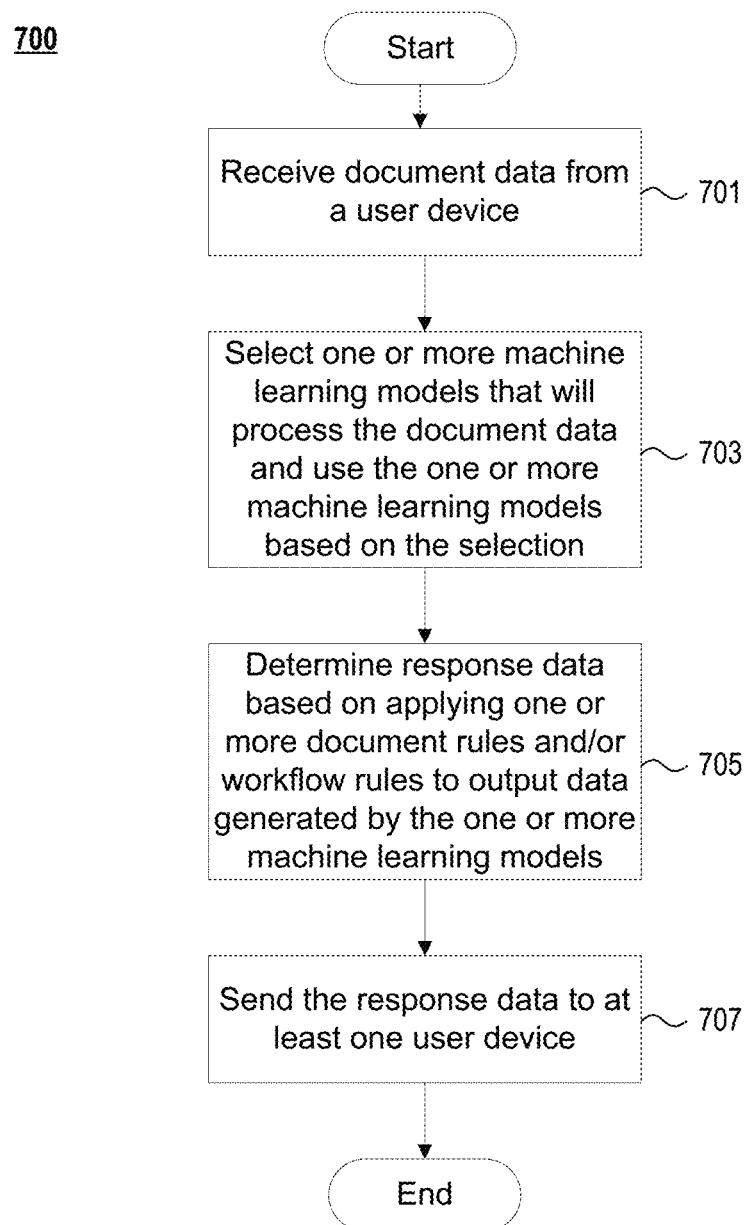
FIG. 7 depicts an example method for determining response data by a computing platform.

FIG. 7 depicts an example method 700 for determining response data by a computing platform. This example method 700 may be implemented, and performed, by the computing platform 104. In this way, the example method 700 may be performed by the computing platform 104 each time the document data 108 is received from a user device (e.g., user device 102). Additionally, the example method 700 may have been performed multiple times in connection with the example display screens of FIGS. 2, 3, 4A-4C, 5A-5C, and 6A-6C. The example method 700 may be performed after the one or more machine learning models 110 have been configured and/or trained, and after the document rules and/or the workflow rules 114 have been configured. In some instances, the one or more machine learning models 110 may have been configured and trained by a provider of the software implemented on the computing platform (e.g., IRONCLAD may have configured and trained the one or more machine learning). The provider may, among other ways of configuring the one or more machine learning models 110, have configured first machine learning models to recognize contractual terms of contracts (e.g., Table I) and second machine learning models to recognize classifications, or types, of clauses of contracts (e.g., Table II). In some arrangements, output data from the first machine learning models may be input to the second machine learning models (e.g., recognized contractual terms may be used as a basis for recognizing whether a particular classification, or type, of clause is in a contract; or a classification may be used as a basis for determining a suggestion or recommendation to a clause). The document rules and/or the workflow rules 114 may have been configured by users associated with the user devices of the networked document workflow environment 100. In this way, the users may define which rules to apply to documents and/or workflows. As part of configuring the document rules and/or workflow rules 114, the users may have defined rules that indicate standardized language for clauses of contracts, that indicate whether certain clauses are not allowed, that indicate which reviewers to add to the workflow for clauses of contracts, and the like. The users may define rules for each document and/or for each workflow. In this way, different rules may be applied for different documents and/or different rules may be applied for different workflows. The example method 700 is discussed by way of a document that includes contractual terms and/or clauses. In this way, for the example method 700, a contract and a document may be used interchangeably.

At step 701, the computing platform may receive document data from a user device. The document data may include a copy, or an entirety, of a document; a portion of a document; and/or data indicating an edit to the document.

At step 703, the computing platform may select one or more machine learning models that will process the document data and use the one or more machine learning models based on the selection. This selection may be based on the specific data included by the document data (e.g., if the document data includes a copy of the document, the document data may be processed by all machine learning models). This selection may be based on the configuration of the machine learning models. For example, the document data may be processed by every machine learning model that is configured to recognize contractual terms of contracts and the resulting output data may be compared to a confidence threshold to determine which recognized contractual terms are above the confidence threshold. The computing platform may store a mapping that associates contractual terms to one or more classifications, or types, of clauses. In this way, the computing platform may determine which classifications, or types, of clauses are potentially in the document based on the recognized contractual terms that are above the confidence threshold. Based on this determination, the computing platform may send the document data to every machine learning model that is configured to recognize the classifications, or types, of clauses that are potentially in the document. This may result in output data that indicates whether the classifications, or types, of clauses are included in the document.

In some arrangements that use one or more natural language processing models, the computing platform may select one or more generative language models and/or one or more extractive language models that will process an entirety of the document data, one or more portions of the document data, or a modified version of the document data. This selection may be performed, for example, based on a user selecting a menu option or pressing a button that is in support of an AI Assist feature provided by IRONCLAD software that allows document data 108 to be processed by the one or more generative language models and/or the one or more extractive language models via a user's single click. Based on the selection of the one or more generative language models and/or the one or more extractive language models, the computing platform may determine one or more tasks the one or more generative language models and/or the one or more extractive language models will perform, determine input for the one or more generative language models and/or the one or more extractive language models based on the one or more tasks and the document data, and provide the input to the one or more generative language models. The input to the one or more generative language models and/or the one or more extractive language models may be the same, or similar to, the input discussed above for the intended natural language processing model in connection with FIG. 1.

At step 705, the computing platform may determine response data based on applying one or more document rules and/or workflow rules to output data generated by the one or more machine learning models. Applying such rules to the output data may determine response data that includes, for example, recommended edits to a clause of the document (e.g., a recommended edit to change a clause to include standardized language or a recommended edit to delete the clause; a recommendation to change a portion of a clause to different text); changes to the workflow (e.g., a reviewer has been added to the workflow based on inclusion of a clause); and the like. The response data may include any of the data used to provide the visual indicators shown in the screenshots of FIGS. 2, 3, 4A-4C, 5A-5C, and 6A-6C.

In some arrangements, response data may include, or otherwise be based on, output from the one or more generative language models. The output from the one or more generative language models may include one or more suggestions or recommendations associated with the document data (e.g., a suggestion to edit a clause, a suggestion to insert a clause into the document data, a recommended location for inserting a clause into the document data, and the like). In this way, the response data may include any of the data used to provide the visual indicators, edits, strikethroughs, underlining, etc., shown in the screenshots of FIGS. 5A-5C.

At step 707, the computing platform may send the response data to at least one user device. The response data may be sent to the same user device that sent the document data to the computing platform and/or may be sent to a different user device. Upon receipt of the response data, at least one user device may update a display screen based on the response data. For example, the user device may update a display screen such that the display screen is the same as, or similar to, the display screens shown in the screenshots of FIGS. 2, 3, 4A-4C, 5A-5C, and 6A-6C. By sending the response data to the at least one user device, the computing platform may cause display of the response data such that visual indications of any suggested edits and recommendations will be displayed to the user in the networked document workflow environment.

Figure 8:
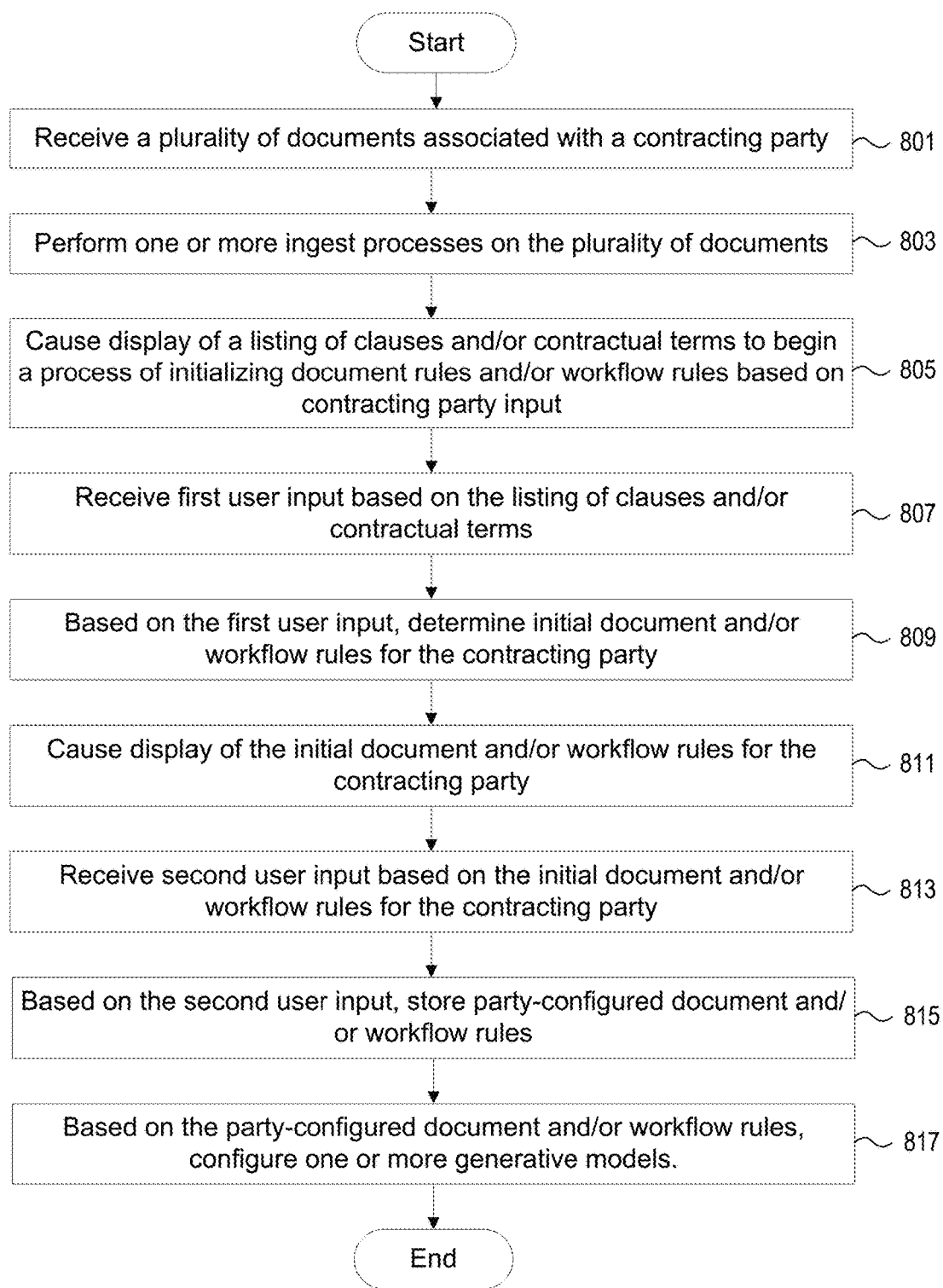
FIG. 8 depicts an example method that may configure a computing platform to perform one or more data processes in connection with an example networked document workflow environment.

FIG. 8 depicts an example method 800 that may configure a computing platform to perform one or more data processes in connection with an example networked document workflow environment. This example method 800 may be implemented, and performed, by the computing platform 104 in connection with the example networked document workflow environment 100 of FIG. 1. For example, the example method 800 may be performed by the computing platform 104 each time a new entity (e.g., a contracting party) wants to initialize the example networked document workflow environment 100 to edit documents they are a party to. Additionally, the example method 800 may have been performed prior to a user being able to edit a document in connection with the example display screens of FIGS. 2, 3, 4A-4C, 5A-5C, and 6A-6C. The example method 800 is discussed by way of documents that include contractual terms and/or clauses. In this way, for the example method 800, a contract and a document may be used interchangeably. Additionally, for simplicity the example networked document workflow environment will be referred to as a workflow environment.

At step 801, the computing platform may receive a plurality of documents associated with a contracting party. The plurality of documents may include copies of documents previously created by the contracting party, such as prior contracts, created and edited in a different computing environment, to which they are a party to.

At step 803, the computing platform may perform one or more ingest processes on the plurality of documents. The one or more ingest processes may include converting the plurality of documents into a format suitable for storage in a document repository of the workflow environment (e.g., document repository 118 of FIG. 1), such as by processing each document to indicate where each clause in the document begins and ends, classifying each clause in the document to identify the types of clauses included in each document, identifying contractual terms within each document, and inserting the document into a search index. In some instances, a document may be converted into an object-oriented format that includes an object for each document, an object for each clause within a document (e.g., which may include an indication of the classification for the clause, and an indication of where the clause begins and ends within the document), and metadata that indicates additional context for the document and/or clauses (e.g., version number of the document, classification indicators for the clauses, and the like). The one or more ingest processes may also include storing the document, after being converted, into the document repository. The one or more ingest processes may also including storing the document, or portions thereof, in a training data repository (e.g., training data repository 122).

At step 805, the computing platform may cause display of a listing of clauses and/or contractual terms to begin a process of initializing document rules and/or workflow rules based on contracting party input. The listing of clauses and/or contractual terms may include an entry for each type of clause included in the plurality of documents (e.g., as determined based on the classification performed when ingesting the plurality of documents), an entry for each type of contractual term included in the plurality of documents (e.g., as determined when ingesting the plurality of documents), and a default risk indication for each type of clause and each type of contractual term. A risk indication may indicate a level of risk to the contracting party for the type of clause or type of contractual term. As one example, a risk indication may be a numeral from 1-5, with 1 being the lowest risk and 5 being the highest risk. The default risk indication may be a pre-established value for the risk indication (e.g., the numeral 2, which indicates low risk). In some arrangements, the listing of clauses and/or contractual terms may be based on an occurrence threshold. In this way, any type of clause or type of contractual term will be displayed if it occurred in the documents equal to or more than the occurrence threshold. Otherwise, any type of clause or type of contractual term that occurred less than the occurrence threshold may be omitted from the list. Additionally, the listing of clauses and/or contractual terms may be displayed along with other information. For example, the other information may include names of parties that countersigned the contracts with the contracting party. Each party may be associated with its own default risk indication.

At step 807, the computing platform may receive first user input based on the listing of clauses and/or contractual terms. The first user input may, for example, modify the listing of clauses and/or contractual terms (e.g., add or remove types of clauses and/or types of contractual terms from the list), modify one or more risk indications associated with a type of clause and/or type of contractual term (e.g., input a higher or lower numeral to indicate a desired risk level for the associated type of clause and/or type of contractual term), and the like. The modified listing of clauses and/or contractual terms may be stored in one or more databases for later access (e.g., form information repository 126 of FIG. 1).

At step 809, the computing platform may, based on the first user input, determine initial document and/or workflow rules for the contracting party. The initial document and/or workflow rules for the contracting party may be based on the listing of clauses and/or contractual terms as modified by the user and any associated risk indicator. For example, the initial document and/or workflow rules may include, for each type of clause and/or type of contractual term, user-configured language and/or standardized language. The user-configured language may be based on actual text of the clauses found in the plurality of contracts. For example, a generative model may be used to determine the user-configured language based on the actual text of the plurality of documents (e.g., a generative model may determine user-configured language for a choice of law clause based on the choice of law clauses in the plurality of contracts). The standardized language may be based on default clause language stored by the computing platform and otherwise not based on the plurality of documents. The initial document and/or workflow rules for the contracting party may also include rules based on a pre-existing templates of document and/or workflow rules. The computing platform may determine which pre-existing template to use based on the plurality of documents, the listing of clauses and/or contractual terms, and/or the risk indicators associated with the listing of clauses and/or contractual terms.

At step 811, the computing platform may cause display of the initial document and/or workflow rules for the contracting party. The display of the initial document and/or workflow rules for the contracting party may be based on the risk indicators associated with the listing of clauses and/or contractual terms. For example, if the risk indicator for a type of clause is equal to or above a threshold (e.g., a threshold of 4 for risk indicators having a value range of 1-5), the initial document and/or workflow rules for the contracting party may indicate a recommendation to use the user-configured language instead of the standardized language. If the risk indicator for a type of clause is below the threshold, the initial document and/or workflow rules for the contracting party may indicate a recommendation to use the standardized language.

At step 813, the computing platform may receive second user input based on the initial document and/or workflow rules for the contracting party. The second user input may, for example, modify the initial document and/or workflow rules (e.g., add or remove rules), select between using user-configured language or standardized language, modify the user-configured language or standardized language, and the like.

The second user input may also indicate various options for the workflow environment. These various options may be used to establish user-configured criteria in the document and/or workflow rules. For example, the second user input may indicate whether the contracting party wants to train and use party-specific natural language processing models for use when editing documents. A party-specific natural language processing model may be a model (e.g., a generative language model and/or an extractive language model) that has been specifically trained based on documents of the contracting party and specifically for use by the contracting party (e.g., a different contracting party would be unable to use the party-specific generative model of the contracting party). As one specific example, the contracting party may want to use party-specific natural language processing models for a particular type of clause (e.g., one with the highest risk indicator). Accordingly, the second user input may indicate the type of clause that will be assigned a party-specific natural language processing model.

At step 815, the computing platform may, based on the second user input, store party-configured document and/or workflow rules. The party-configured document and/or workflow rules may include the initial document and/or workflow rules as modified by the second user input. The party-configured document and/or workflow rules may be stored in one or more databases for later access (e.g., rules repository 124 and/or form information repository 126 of FIG. 1).

At step 817, the computing platform may, based on the party-configured document and/or workflow rules, configure one or more natural language processing models. Configuring the one or more natural language processing models may include configuring one or more generative models and/or one or more extractive language models based on the confidence threshold if it was provided as part of the second user input. Configuring the one or more natural language processing models may include training one or more party-specific natural language processing models. The training may be performed based on zero-shot or few-shot learning techniques (e.g., a party-specific generative language model may be further trained based on the zero-shot or few-shot learning techniques). In some instances, training the party-specific natural language processing models may include receiving additional training data from the contracting party.

After the example method 800 of FIG. 8 ends, users of the contracting party may be able to edit documents based on the party-configured document and/or workflow rules. In this way, the various display screens of FIGS. 2, 3, 4A-4C, 5A-5C, and 6A-6C may be displayed as a user edits a document when applying the party-configured document and/or workflow rules. Further, the various display screens of FIGS. 2, 3, 4A-4C, 5A-5C, and 6A-6C may be displayed based on using a party-specific natural language processing model that was configured at step 817.

The example method of FIG. 8 provides only one example method that may be performed when initializing the example networked document workflow environment for a contracting party. For example, steps 801 and 803 may be skipped and the method may start at step 805 if the user does not want to provide a plurality of documents for analysis at step 803. In such arrangements, the computing platform may provide, at step 805, a default list of clause types and associated risk indicators.

Figure 9:
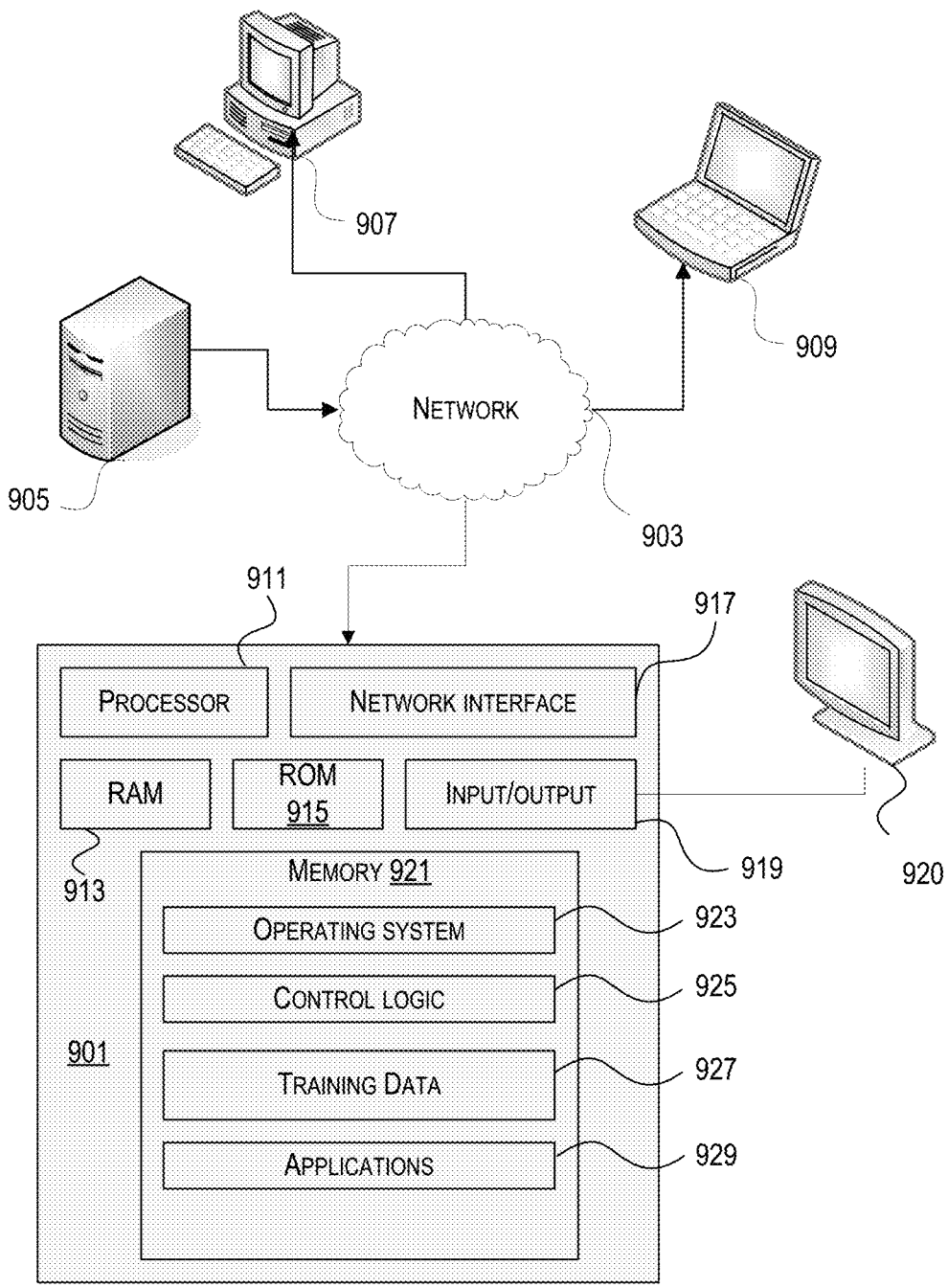
FIG. 9 illustrates an example of a computing device that may be used to implement one or more illustrative aspects discussed herein.

In view of FIGS. 1-3, 4A-4C, 5A-5C, 6A-6C, 7, and 8, methods, systems, and devices for recommending edits to a document and changes to a workflow of the document have been discussed. FIG. 9 illustrates one example of a computing device 901 that may be used to implement one or more illustrative aspects discussed herein. For example, the computing device 901 may implement one or more aspects of the disclosure by reading and/or executing instructions and performing one or more actions based on the instructions. The computing device 901 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

The computing device 901 may operate in a standalone environment or a networked environment. As shown in FIG. 9, various network nodes 901, 905, 907, and 909 may be interconnected via a network 903, such as the Internet. Other networks may also or alternatively be used, including private intranets, corporate networks, LANs, wireless networks, personal networks (PAN), and the like. Network 903 is for illustration purposes and may be replaced with fewer or additional computer networks. A local area network (LAN) may have one or more of any known LAN topology and may use one or more of a variety of different protocols, such as Ethernet. Devices 901, 905, 907, 909 and other devices (not shown) may be connected to one or more of the networks via twisted pair wires, coaxial cable, fiber optics, radio waves or other communication media.

As seen in FIG. 9, the computing device 901 may include a processor 911, RAM 913, ROM 915, network interface 917, input/output interfaces 919 (e.g., keyboard, mouse, display, printer, etc.), and memory 921. Processor 911 may include one or more computer processing units (CPUs), graphical processing units (GPUs), and/or other processing units such as a processor adapted to perform computations associated with speech processing or other forms of machine learning. I/O 919 may include a variety of interface units and drives for reading, writing, displaying, and/or printing data or files. I/O 919 may be coupled with a display such as display 920. Memory 921 may store software for configuring computing device 901 into a special purpose computing device in order to perform one or more of the various functions discussed herein. Memory 921 may store operating system software 923 for controlling overall operation of the computing device 901, control logic 925 for instructing computing device 901 to perform aspects discussed herein, training data 927, and other applications 929. The computing device 901 may include two or more of any and/or all of these components (e.g., two or more processors, two or more memories, etc.) and/or other components and/or subsystems not illustrated here.

Devices 905, 907, 909 may have similar or different architecture as described with respect to computing device 901. Those of skill in the art will appreciate that the functionality of computing device 901 (or device 905, 907, 909) as described herein may be spread across multiple data processing devices, for example, to distribute processing load across multiple computers, to segregate transactions based on geographic location, user access level, quality of service (QOS), etc. For example, devices 901, 905, 7907, 909, and others may operate in concert to provide parallel computing features in support of the operation of control logic 925.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Although the subject matter has been described in language specific to structural features and/or methodological acts, it is to be understood that the subject matter described herein and as further illustrated by the accompanying drawings, are not necessarily limited to the specific features or acts described above or as further illustrated by the accompanying drawings and appendix. Rather, the specific features and acts described above are disclosed as examples that illustrate some of the forms in which devices can be implemented to perform one or more aspects described herein and as further illustrated by the accompanying drawings, and as example forms of implementing any claim or any of the appended claims.

We claim:

1. A method comprising:
receiving, by a computing device, a contract document comprising a plurality of clauses;
providing at least a first portion of the contract document as input to an extractive language model that is configured to classify legal clauses of a contract document as one or more types of clauses, wherein the first portion of the contract document comprises a first clause;

determining, using the extractive language model, a classification for the first portion of the contract indicating that the first clause is of a first type of clause, of the one or more types of clauses;

providing at least the first portion of the contract document and the determined classification for the first portion of the contract document as input to a generative language model that is configured to determine suggested edits to a contract document based on a plurality of pre-configured rules corresponding to the one or more types of clauses;

determining, using the generative language model, a suggested edit to the contract document based on a difference between at least one contract term of the first portion of the contract document and a specified contract term of a first pre-configured rule corresponding to the first type of clause; and generating, by the computing device, output data generated based on the determined classification for the first portion of the contract document and the suggested edit to the contract document, wherein the output data comprises an indication of the first portion of the contract document, the first type of clause, and the suggested edit to the contract document.

2. The method of claim 1, wherein the first pre-configured rule comprises approved language for the first type of clause, and
wherein determining, using the generative language model, the suggested edit to the contract document is based on a difference between at least one contract term of the first portion of the contract document and a specified contract term in the approved language for the first type of clause.

3. The method of claim 1, wherein the first pre-configured rule comprises one or more required contract terms for the first type of clause, and
wherein determining, using the generative language model, the suggested edit to the contract document is based on a difference between at least one contract term of the first portion of the contract document and a required contract term for the first type of clause.

4. The method of claim 1, further comprising:
causing, by the computing device, display of the output data to provide a visual indication of the first suggested edit to the user in a networked document workflow environment.

5. The method of claim 1, wherein the suggested edit comprises a revision to the language of the first portion of the contract document.

6. The method of claim 1, wherein the suggested edit comprises a modification to an approval workflow of the contract document.

7. The method of claim 1, wherein the output data further comprises an explanation of the suggested edit based on the first pre-configured rule.

8. The method of claim 7, further comprising:
determining, using the generative language model, the explanation of the suggested edit based on the first pre-configured rule.

9. The method of claim 1, wherein providing the first portion of the contract document as input to the extractive language model is based on user input comprising a selection of the first portion of the contract document.

10. The method of claim 1, wherein providing the first portion of the contract document as input to the extractive language model is based on detecting user input comprising an edit to the first portion of the contract document.

11. The method of claim 1, wherein the generative language model comprises a Generative Pre-Trained Transformer (GPT).

12. The method of claim 1, wherein at least one of the plurality of pre-configured rules was generated by a natural language processing model based on approved language in another contract document for a corresponding type of clause.

13. The method of claim 1, wherein at least one of the plurality of pre-configured rules was generated based on user input comprising an indication of required contract terms for a corresponding type of clause.

14. The method of claim 1, wherein at least one of the plurality of pre-configured rules was generated based on user input comprising an indication of approved language for a corresponding type of clause.

15. A computing device comprising:
one or more processors; and
memory storing instructions that, when executed by the one or more processors, cause the computing device to:
receive a contract document comprising a plurality of clauses;
provide at least a first portion of the contract document as input to an extractive language model that is configured to classify legal clauses of a contract document as one or more types of clauses, wherein the first portion of the contract document comprises a first clause;
determine, using the extractive language model, a classification for the first portion of the contract indicating that the first clause is of a first type of clause, of the one or more types of clauses;
provide at least the first portion of the contract document and the determined classification for the first portion of the contract document as input to a generative language model that is configured to determine suggested edits to a contract document based on a plurality of pre-configured rules corresponding to the one or more types of clauses;
determine, using the generative language model, a suggested edit to the contract document based on a difference between at least one contract term of the first portion of the contract document and a specified contract term of a first pre-configured rule corresponding to the first type of clause; and
generate, by the computing device, output data generated based on the determined classification for the first portion of the contract document and the suggested edit to the contract document, wherein the output data comprises an indication of the first portion of the contract document, the first type of clause, and the suggested edit to the contract document.

16. The computing device of claim 15, wherein:
at least one pre-configured rule comprises approved language for a corresponding type of clause, and
at least one other pre-configured rule comprises one or more required contract terms for a corresponding type of clause.

17. The computing device of claim 15, wherein the suggested edit comprises a revision to the language of the first portion of the contract document.

18. The method of claim 15, wherein the suggested edit comprises a modification to an approval workflow of the contract document.

19. One or more non-transitory computer-readable media storing instructions that, when executed by one or more processors, cause a computing device to perform steps comprising:

receiving a contract document comprising a plurality of clauses;

providing at least a first portion of the contract document as input to an extractive language model that is configured to classify legal clauses of a contract document as one or more types of clauses, wherein the first portion of the contract document comprises a first clause;

determining, using the extractive language model, a classification for the first portion of the contract indicating that the first clause is of a first type of clause, of the one or more types of clauses;

providing at least the first portion of the contract document and the determined classification for the first portion of the contract document as input to a generative language model that is configured to determine suggested edits to a contract document based on a plurality of pre-configured rules corresponding to the one or more types of clauses;

determining, using the generative language model, a suggested edit to the contract document based on a difference between at least one contract term of the first portion of the contract document and a specified contract term of a first pre-configured rule corresponding to the first type of clause; and generating output data generated based on the determined classification for the first portion of the contract document and the suggested edit to the contract document, wherein the output data comprises an indication of the first portion of the contract document, the first type of clause, and the suggested edit to the contract document.

20. The computer-readable media of claim 19, wherein:

the first pre-configured rule comprises approved language for the first type of clause, and the suggested edit comprises a revision to the language of the first portion of the contract document based on the approved language for the first type of clause.

* * * * *